US006046824A

United States Patent [19]
Barak

[11] Patent Number: 6,046,824
[45] **Date of Patent: *Apr. 4, 2000**

[54] FACSIMILE LONG TERM STORAGE AND RETRIEVAL SYSTEM

[75] Inventor: Haim Barak, Kfar Saba, Israel

[73] Assignee: Nice Systems, Ltd., Tel Aviv, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,959

[22] Filed: Jul. 24, 1997

Related U.S. Application Data

[63] Continuation-in-part of application No. 08/797,484, Feb. 6, 1997, Pat. No. 5,861,959.

[51] Int. Cl.[7] .......... H04N 1/00
[52] U.S. Cl. .......... 358/400; 358/405; 358/468; 379/100.01; 379/100.09
[58] Field of Search .......... 358/400, 402, 358/407, 434, 435, 436, 440, 468; 370/351, 354, 360, 362–386; 379/100.04, 100.06, 100.12, 100.13, 102.02, 67

[56] References Cited

U.S. PATENT DOCUMENTS

| | | | |
|---|---|---|---|
| 4,786,974 | 11/1988 | Ina | 358/257 |
| 4,935,955 | 6/1990 | Neudorfer | 379/100 |
| 4,994,926 | 2/1991 | Gordon et al. | 358/400 |
| 5,014,300 | 5/1991 | Harvath et al. | 379/100 |
| 5,235,433 | 8/1993 | Clarkson et al. | 358/434 |
| 5,237,450 | 8/1993 | Sakurai | 358/444 |
| 5,323,450 | 6/1994 | Goldhagen et al. | 379/100 |
| 5,347,572 | 9/1994 | Avni | 379/100 |
| 5,357,562 | 10/1994 | Metser et al. | 379/100 |
| 5,454,030 | 9/1995 | De Oliveira et al. | 379/100 |
| 5,461,488 | 10/1995 | Witek | 358/402 |
| 5,861,959 | 1/1999 | Barak | 358/403 |

FOREIGN PATENT DOCUMENTS

| | | | |
|---|---|---|---|
| 2282725A | 4/1995 | United Kingdom | H04N 1/21 |

OTHER PUBLICATIONS

ITUT T.33 (Jul. 1996) "Series T: Terminal Equipments and Protocols for Telematic Services" "Facsimile routing utilizing subadress."

*Primary Examiner*—Jerome Grant, II
*Attorney, Agent, or Firm*—Needle & Rosenberg, P.C.

[57] ABSTRACT

A passive long term facsimile transmission storage and retrieval system, which includes a facsimile logger passively or actively coupled to at least one telephone line connected to a facsimile machine is provided. The facsimile logger acquires and stores the facsimile transmissions that occur on the telephone line, on long term archive media. The system also includes a database coupled to the facsimile logger and at least one workstation coupled to the facsimile logger. The database holds relevant data associated with the stored facsimile transmission. The workstation is able to search for and retrieve the facsimile transmissions previously stored by the facsimile logger on the long term archive media. The fax logger also includes the capability for a user to enter a series of numbers that provide information concerning the identity of the operator, the account number for billing purposes and any subaddressing related data. The series of numbers are entered on the keypad of the fax machine. The fax logger also includes a fax line monitor for checking for and reporting any malfunctions found in either the line or the fax machine itself.

14 Claims, 14 Drawing Sheets

FACSIMILE LONG TERM STORAGE AND RETRIEVAL SYSTEM

CROSS REFERENCE TO RELATED APPLICATIONS

This application is a continuation-in-part application of U.S. patent application Ser. No. 08/797,484 filed Feb. 6, 1997 now U.S. Pat. No. 5,861,959.

FIELD OF THE INVENTION

The present invention relates generally to facsimile logging devices and in particular to an active and passive facsimile long term storage and retrieval system.

BACKGROUND OF THE INVENTION

The use of facsimile transmission equipment has been steadily increasing over recent years. Facsimile transmission is a very convenient mechanism of transmitting documents and images from one location to another in near real time. The almost instantaneous transmission speed of facsimile transmission equipment is a huge advantage over regular conventional mail delivery and accounts for the immense popularity of facsimile as the transmission mechanism of choice in many businesses.

With the exploding use of facsimile equipment today, there are many businesses that conduct a substantial amount of their business through facsimile transmissions. In addition, many businesses and government agencies use facsimile equipment to send and receive data on a daily basis. These same companies typically also employ sophisticated telephone systems for handling their high volume of inbound and outbound telephone calls. Many businesses such as banking institutions, insurance companies and government entities have an additional requirement of recording and archiving telephone conversations occurring on company telephones. The necessity of recording telephone calls might be required for any number of reasons such as security, liability, eavesdropping, etc. Telephone archiving systems exist today and are employed by many businesses to record, on a long term basis, all internal and external telephone calls.

The majority of businesses today, such as banking institutions, insurance companies, law firms and government agencies, employ one or more local area networks (LANs) to connect their computer terminals together and to permit the sharing of information. In addition, almost every business today employs one or more facsimile machines to send and receive documents over telephone lines. It would be very desirable if the facsimile machines within an organization could be controlled from the LAN. Further, it would also be desirable if the facsimile machines could be interfaced to network applications that perform billing and maintenance functions.

The necessity to account and for facsimile document transmissions exists today and is currently performed either manually or by specific hardware which is connected to the facsimile machine. An operator keys in the identification and/or account information for the document to be faxed. Currently no means exists for coupling a facsimile machine to billing applications that does not require specialized hardware to be attached to the facsimile machine.

In addition, the process of sending a document from a facsimile machine, in the majority of businesses, requires that the operator place the document in the facsimile machine and wait until a confirmation is generated that the transmission was successful or not. Currently, no means exists whereby the user can get confirmation sent to their networked computer workstation that her/his document was successfully transmitted.

Further, in the majority of large organizations, tens or even hundreds of facsimile machines are installed. Thus, there is a need for centralized management of these facsimile machines. It is desirable that the central management provide status data concerning the operational status of all the facsimile machines in the organization. Thus, a technician can be informed that a specific facsimile machine is either disconnected from the telephone line or is malfunctioning, for example.

Also, most modern facsimile machines today support what is called subaddressing which entails the transmission of additional codes that are typically used to route incoming facsimile transmissions. The rules for routing facsimile messages are defined in ITU T.30 and T.33 standard specifications. However, the majority of facsimile machines in use today do not support subaddressing. It would be desirable if the subaddressing feature could be added to facsimile machines that do not incorporate this feature.

As with voice telephone call long term storage and retrieval, there is a long felt need by many businesses to be able to store on a long term basis, both inbound and outbound facsimile transmissions. Facsimile storage systems exist in the prior art however none disclose the long term storage, archival and retrieval of facsimile transmissions.

U.S. Pat. No. 4,935,955, issued to Neudorfer, discloses a system for interfacing central office telephone lines with internal facsimile machines. Incoming facsimile transmission data is placed in a memory temporary storage area after being received and before being transmitted. Facsimile transmissions are deleted from the storage after they are transmitted.

U.S. Pat. No. 5,235,433, issued to Clarkson et al., discloses a system and method for automatically indexing facsimile transmissions into an image management system by applying telephony data accompanying the facsimile transmission to index the transmission by use of a substitution table.

U.S. Pat. No. 5,357,562, issued to Metser et al., discloses an automated facsimile/voice memory managing system which includes a facsimile board, a voice response board, a storage device and central processing unit (CPU). The storage means disclosed, however, is used to store facsimile transmissions on a temporary basis.

U.S. Pat. No. 5,014,300, issued to Harvath et al., discloses a facsimile store and forward network that includes a network access device and an address processing unit that cooperates to interface an originating facsimile machine with a store and forward inbound node. Facsimile transmissions, however, are stored on a temporary basis only.

Another potential problem that exists in present facsimile transmission storage devices is that if the facsimile transmission equipment is using a proprietary non-standard facsimile protocol, it becomes impossible to receive and store it without knowledge of the protocol. One solution to this problem is to have the facsimile transmission recording equipment determine the facsimile protocol to use and subsequently instruct the two facsimile machines accordingly.

SUMMARY OF THE INVENTION

Accordingly, the present invention provides a long term facsimile transmission storage system whereby facsimile transmissions are archived on industry standard archive devices to be stored for relatively long periods of time. The facsimile search and retrieval system is also able to search for, locate and retrieve any facsimile transmission previously archived. The system is able to record facsimile transmissions in a passive manner without interfering with the transmissions, can be configured to actively store and forward facsimile transmissions and is able to select the facsimile transmission protocol used by the facsimile transmission equipment on both sides of the transmission.

The present invention also provides a networking solution for facsimile machines through which billing, centralized management and confirmation of transmissions can be obtained through computer workstations connected to the network. In addition, a malfunction in a facsimile machine can be detected by a computer workstation on the network and, in response, the facsimile machine can be taken off-line. The longer term facsimile transmission storage and retrieval system includes a facsimile logger coupled between at least one telephone and at least one facsimile machine. The facsimile logger stored and forwards facsimile transmission that arrive on the at least one telephone line or that are originated by the at least one facsimile machine. The facsimile logger stores the facsimile transmission on long term archive media and includes a database for holding relevant data associated with the stored facsimile transmission. At least one computer workstation is connected to the same LAN that the facsimile logger is connected to. The computer workstation is used to search for and retrieve facsimile transmission previously stored by the facsimile logger on the long term archive media.

The present invention also provides for the capability of a user of a facsimile machine to enter a series of numbers separated by a delimiter, such as the '#' symbol, that provide information concerning the identity of the operator, the account number for billing purposes, any subaddressing related data and the requested transmission priority. The series of numbers are entered on the keypad built in to almost all facsimile machines.

There is therefore provided in accordance with the present invention a long term facsimile transmission storage and retrieval system, comprising a facsimile logger coupled between at least one telephone line and at least one facsimile machine, the facsimile logger storing and forwarding inbound facsimile transmissions that arrive on the at least one telephone line and outbound facsimile transmission that originate from the at least one facsimile machine, the facsimile logger storing the facsimile transmissions on long term archive media, a database coupled to the facsimile logger, the database for holding relevant data associated with the stored facsimile transmission, at least one workstation coupled to the facsimile logger, the at least one workstation able to search and retrieve the facsimile transmissions previously stored by the facsimile logger on the long term archive media, means for accepting and processing data supplied by a user, the data including operator identity, account information for billing and subaddress data, means for generating and sending a confirmation message to the user regarding the result of the facsimile transmission, and means for appending the subaddress data to the outbound facsimile transmissions.

The system further comprises bypass means coupled between the facsimile logger and the at least one telephone line and between the facsimile logger and the at least one facsimile machine, the bypass means operative to receive a keep alive indication from the facsimile logger, the bypass means operative to disconnect the facsimile logger and connect the at least one telephone line directly to the at least one facsimile machine in the event the keep alive indication is not received within a predetermined time period.

There is also provided in accordance with the present invention a facsimile logger coupled between a telephone line and a facsimile machine, comprising a telephone line interface coupled to the telephone line, the telephone line interface interfacing the telephone line to an internal data bus, a facsimile line interface coupled to the facsimile machine, the facsimile line interface for interfacing the facsimile machine to the internal data bus, a switch having an input port and an output port, the input port coupled to the internal data bus, the output port coupled to a fax/modem, the switch able to couple the telephone line interface to the fax/modem and the facsimile machine to the fax/modem, the fax/modem coupled to the switch, the fax/modem for translating the facsimile transmissions between a telephone line facsimile signal format and digital facsimile data, a processor coupled to the fax/modem for receiving and processing the digital facsimile data, the processor controlling the operation of the facsimile logger, the processor for determining the input to output configuration of the switch, a database coupled to the processor, the database holding relevant data associated with the facsimile transmissions, storage means coupled to the processor, the storage means providing a temporary memory storage area for the facsimile transmissions as they are received from the telephone line, an archive subsystem coupled to the processor, the archive subsystem recording the facsimile transmissions on long term archive media, the archive subsystem retrieving the facsimile transmissions, previously archived, upon command from the processor, means for accepting and processing data supplied by a user, the data including operator identity, account information for billing and subaddress data, means for generating and sending a confirmation message to the user regarding the result of the facsimile transmission, and means for appending the subaddress data to the outbound facsimile transmissions.

Also, there is provided in accordance with the present invention a multi-channel facsimile logger coupled to N telephone lines and to N facsimile machines, comprising N telephone line interfaces coupled to the N telephone lines, the N telephone line interfaces for interfacing the N telephone lines to an internal data bus, N facsimile line interfaces coupled to the N facsimile machines, the N facsimile line interfaces interfacing the N facsimile machines to the internal data bus, a switch having N input ports and M output ports, the N input ports coupled to the internal data bus, the M output ports coupled to M fax/modems, the switch able to couple any one telephone line interface to any one fax/modem and any one facsimile machine to any one fax/modem, the M fax/modems coupled to the M output ports, the M fax/modems for translating the facsimile transmissions between a telephone line facsimile signal format and digital facsimile data, a processor coupled to the M fax/modems for receiving and processing the digital facsimile data, the processor controlling the operation of the active facsimile logger, the processor for determining the input to output configuration of the switch, a database coupled to the processor, the database holding relevant data associated with the facsimile transmissions, a storage coupled to the processor, the storage providing a temporary memory storage area for the facsimile transmissions as they are received from the telephone line, an archive subsystem coupled to the processor, the archive subsystem recording the facsimile transmissions on long term archive media, the archive subsystem retrieving the facsimile transmissions, previously archived, upon command from the processor, means for accepting and processing data supplied by a user, the data including operator identity, account information for billing and subaddress data, means for generating and sending a confirmation message to the user regarding the result of the facsimile transmission, means for appending the subaddress data to the outbound facsimile transmissions, and wherein N and M are both positive integers.

In addition, there is provided in accordance with the present invention a multi-channel facsimile logger, comprising L passive telephone line interfaces coupled to L telephone lines, the L passive telephone line interfaces interfacing the L telephone lines to an internal data bus, the L passive telephone interfaces operative to not interfere with facsimile transmissions occurring on the L telephone lines, a facsimile detector coupled to the L passive telephone line interfaces, the facsimile detector detecting the presence of the facsimile transmissions on the L telephone lines, N telephone line interfaces coupled to N telephone lines, the N telephone line interfaces interfacing the N telephone lines to an internal data bus, N facsimile line interfaces coupled to N facsimile machines, the N facsimile line interfaces interfacing the N facsimile machines to the internal data bus, a switch having N input ports and M output ports, the N input ports coupled to the internal data bus, the M output ports coupled to M fax/modems, the switch able to couple any one of the N telephone line interfaces to any one of the M fax/modems, any one of the N facsimile machines to any one of the M fax/modems and any one of the L passive telephone line interfaces to any one of the M fax/modems, the M fax/modems coupled to the M output ports, the M fax/modems for translating the facsimile transmissions between a telephone line facsimile signal format and digital facsimile data, a processor coupled to the M fax/modems for receiving and processing the digital facsimile data, the processor controlling the operation of the active facsimile logger, the processor for determining the input to output configuration of the switch, a database coupled to the processor, the database holding relevant data associated with the facsimile transmissions, a storage coupled to the processor, the storage providing a temporary memory storage area for the facsimile transmissions as they are received from the telephone line, an archive subsystem coupled to the processor, the archive subsystem recording the facsimile transmissions on long term archive media, the archive subsystem retrieving the facsimile transmissions, previously archived, upon command from the processor, means for accepting and processing data supplied by a user, the data including operator identity, account information for billing and subaddress data, means for generating and sending a confirmation message to the user regarding the result of the facsimile transmission, means for appending the subaddress data to the outbound facsimile transmissions, and wherein L, M and M are positive integers.

Further, there is provided in accordance with the present invention a multi-channel facsimile logger coupled to N telephone lines and to N facsimile machines, comprising N telephone line interfaces coupled to the N telephone lines, the N telephone line interfaces for interfacing the N telephone lines to an internal data bus, N facsimile line interfaces coupled to the N facsimile machines, the N facsimile line interfaces interfacing the N facsimile machines to the internal data bus, a switch having N input ports and M output ports, the N input ports coupled to the internal data bus, the M output ports coupled to M fax/modems, the switch able to couple any one telephone line interface to any one fax/modem and any one facsimile machine to any one fax/modem, the M fax/modems coupled to the M output ports, the M fax/modems for translating the facsimile transmissions between a telephone line facsimile signal format and digital facsimile data, a processor coupled to the M fax/modems for receiving and processing the digital facsimile data, the processor controlling the operation of the active facsimile logger, the processor for determining the input to output configuration of the switch, bypass means coupled between the logger and the N telephone lines and between the logger and the N facsimile machines, the bypass means operative to receive a keep alive indication from the facsimile logger, the bypass means operative to disconnect the facsimile logger and connect the N telephone lines directly to the N facsimile machines in the event the keep alive indication is not received within a predetermined time period, and wherein N and M are both positive integers.

There is also provided in accordance with the present invention a method of monitoring a connection from a fax logger to a fax machine, the fax logger connected to the fax machine via a fax line, the method comprising the steps of determining whether the fax machine was idle for a predetermined amount of time, sending a test document transmission from the fax logger to the fax machine, if the fax line is not ready, reporting a malfunction of the fax line, and if the test document transmission failed, reporting a malfunction in the fax machine.

Also, there is provided in accordance with the present invention a method of processing a facsimile transmission received through a fax logger coupled between at least one telephone line and at least one facsimile machine, the method comprising the steps of determining whether the facsimile transmission is inbound or outbound, if the facsimile transmission is outbound, intercepting digits dialed onto one of the N telephone lines, the digits representing a destination number and additional user data, the additional user data includes operator identity, account information for billing and subaddress data, if the facsimile transmission is inbound, receiving the facsimile transmission through the one of the N telephone lines, adding a facsimile transmission record to a database, translating the facsimile transmission into a standard format, storing the facsimile transmission in a storage means, and adding the facsimile transmission to an archive queue.

In addition, there is provided in accordance with the present invention a method of processing a facsimile transmission received from a user through a fax logger coupled between at least one telephone line and a plurality of facsimile machines, the method comprising the steps of determining whether the facsimile transmission is inbound or outbound, if the facsimile transmission is outbound: determining subaddress information associated with the facsimile transmission, translating the facsimile transmission from a standard format into a facsimile format, sending the facsimile transmission to a facsimile machine in accordance with the subaddress information, if the facsimile transmission is inbound: causing the at least one telephone line to go off-hook, dialing a destination telephone number, translating the facsimile transmission from a standard format into a facsimile format, appending subaddress information to the facsimile transmission, sending the facsimile transmission to the at least one telephone line, and sending a result of the facsimile transmission to the user.

BRIEF DESCRIPTION OF THE DRAWINGS

The invention is herein described, by way of example only, with reference to the accompanying drawings, wherein.

DETAILED DESCRIPTION OF THE INVENTION

Figure 1:
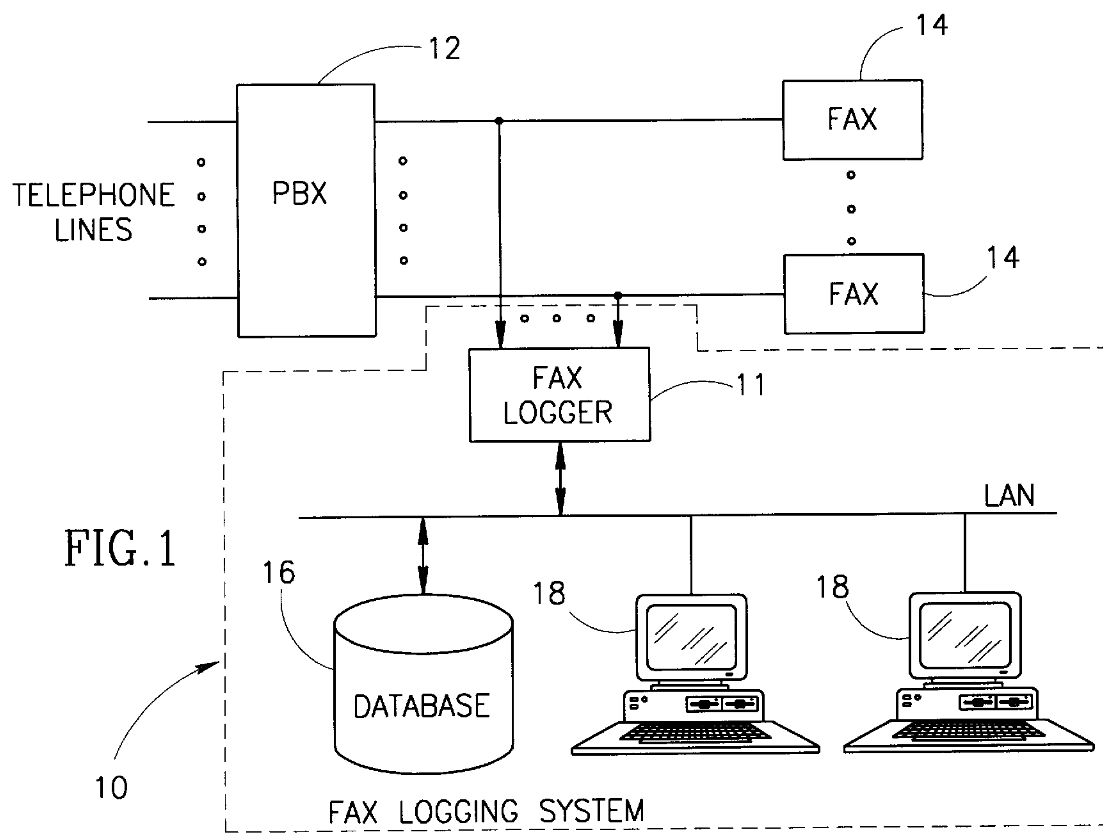
FIG. 1 is a high level block diagram illustrating an embodiment of the passive facsimile logging system of the present invention applied to a sample telephone system having multiple attached facsimile devices.

A high level block diagram illustrating an embodiment of a passive facsimile (fax) logging system 10 of the present invention applied to a sample telephone system having multiple attached facsimile devices is shown in FIG. 1. One or more telephone or trunk lines from a central office (CO) are coupled to a private branch exchange (PBX) 12. One or more extensions couple PBX 12 to one or more facsimile machines 14. Fax logger 11 is coupled in a passive manner to each PBX extension connected to a facsimile machine. The passive connection does not interfere in the sending and receiving of facsimiles from and to the facsimile machines 14. Fax logger 11 listens to the each extension it is coupled to and when it senses a facsimile transmission present on the line, it records related data in a database 16 and archives the transmission on suitable archive media such as magnetic tape, optical disk (i.e. write once read many (WORM), magneto-optical, etc.) or high capacity conventional hard disk drives. Database 16 can be either external to fax logger 11 or integrated internally within fax logger 11. In the example illustrated in FIG. 1, database 16 is shown coupled to fax logger 11 through a local area network (LAN).

Fax logging system 10 also includes retrieval capabilities whereby any facsimile previously stored and archived by the fax logging system can be searched for and retrieved.

One or more workstations 18 are coupled to fax logger 11 through the LAN. Workstations 18 provide the software front end user interface to allow a user to construct search queries and browse through retrieved facsimile records. Included are other various software tools used in connection with searching and viewing previously archived facsimile records. In an alternative embodiment, the user interface employed in workstations 18 can be integrated within fax logger 11 itself.

Illustrated in FIG. 1 is an example of an embodiment of the passive fax logging system. A passive fax logging system is advantageous because it does not interfere at all in the process of sending and receiving facsimiles. No interference is possible if standard facsimile protocols are used in the transmission (i.e. International Telegraphic Union (ITU) facsimile protocols). However, preventing interference with facsimile transmissions is not always feasible because it is possible that two facsimile machines do not use a standard protocol but rather use a company proprietary or otherwise non-standard facsimile protocol. A solution to this problem is to become active in the facsimile acquisition process rather than remain passive. In the alternative active embodiment, the fax logging system determines what facsimile transmission protocols both sides will use. The fax logging system chooses a standard protocol for both sides of the transmission.

Figure 2:
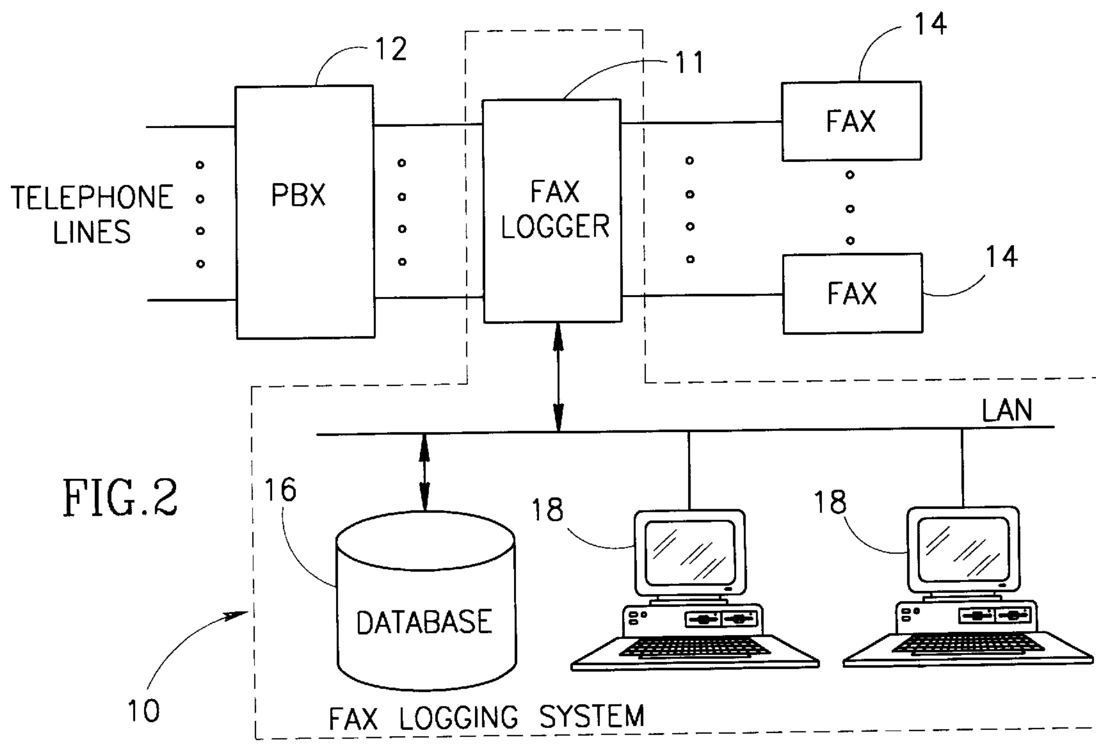
FIG. 2 is a high level block diagram illustrating an embodiment of the active facsimile logging system of the present invention applied to a sample telephone system having multiple attached facsimile devices.

A high level block diagram illustrating an alternative embodiment of the active facsimile logging system of the present invention applied to a sample telephone system having multiple attached facsimile devices is shown in FIG. 2. In this active embodiment, fax logging system comprises fax logger 11 coupled between PBX 12 and facsimile machines 14, database 16 coupled to a LAN and one or more workstations 18. As in FIG. 1, one or more telephone or trunk lines from the CO are coupled to PBX 12. One or more PBX extensions are coupled to fax logger 11. Fax logger 11, in turn, is coupled to one or more facsimile machines 14. All facsimile transmissions must pass through fax logger 11. Using this scheme, fax logger 11 can determine the transmission protocol to use for both sides of the transmission.

As in the passive embodiment discussed above, database 16 is illustrated external to fax logger 11 but can also be integrated internally with fax logger 11. Similarly, workstations 18 provide the software tools comprising the user interface for retrieving and browsing or viewing previously archived facsimiles and can be located external to fax logger 11 or integrated internally with it.

Figure 3:
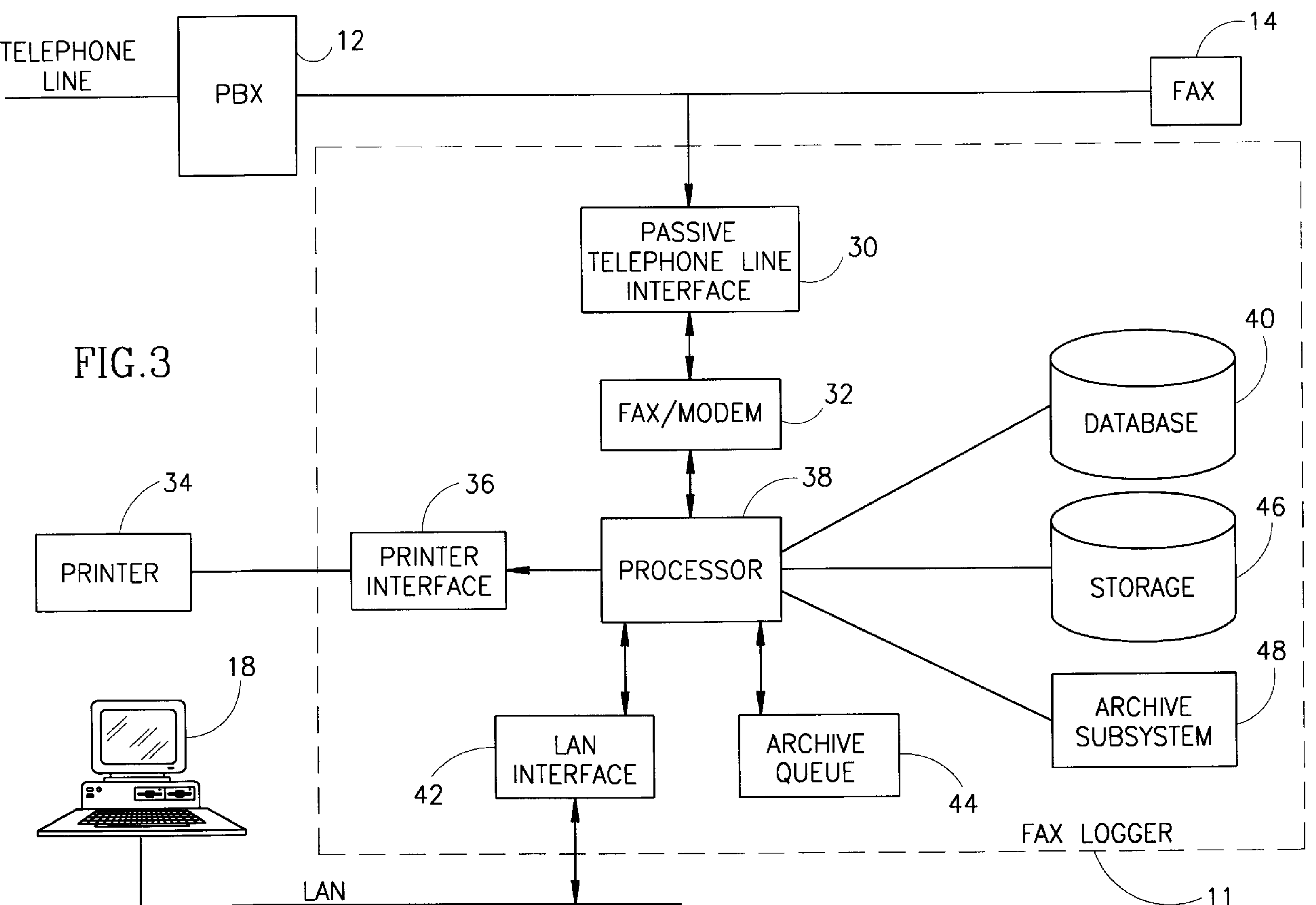
FIG. 3 is a detailed block diagram illustrating a single channel passive facsimile logging system applied to a sample telephone system.

With reference to FIG. 3, fax logger 11 will now be described in more detail. Illustrated in FIG. 3 is an embodiment of a single channel passive fax logger 11. A telephone line or think from the CO is coupled to PBX 12. An extension line connects PBX 12 to facsimile machine 14.

Fax logger 11 comprises a passive line interface 30, fax/modem 32, processor 38, database 40, storage 46, archive subsystem 48, archive queue 44, LAN interface 42, computer workstation 18 and printer interface 36. Passive fax logger 11 constantly listens to the extension line and waits for a facsimile transmission. Once a facsimile transmission is detected, fax logger 11 stores it, records pertinent related data in a database and records the facsimile transmission on archive media.

Fax logger 11 listens to the PBX extension line through passive line interface 30. Circuitry in passive line interface 30 functions to unobtrusively allow the fax logger to hear everything that occurs on the line but does not interfere in the sending or retrieving of facsimiles. Devices that perform this listening function are well known in the art, being used extensively in voice recording systems, thus they will not be described in further detail. The signal received by passive line interface 30 is output to fax/modem 32. Fax/modem 32 functions to receive the tapped signal and, using the appropriate facsimile transmission protocol, convert the facsimile transmission into a more practical and usable digital format. As with passive line interface 30, fax/modem devices are also well known in the art and thus need not be described further. Standard fax/modems used today in many personal computer applications will work in the present invention with minor modification. Conventional fax/modems are designed to connect to a telephone line, typically through an RJ-11 connector. The signals present on a telephone line are similar but not identical to the signals output by passive line interface 30. The modifications needed to be made pertain to matching the electrical interface to the passive telephone line interface and would be apparent to one skilled in the art.

The digital data output from fax/modem 32 is input to processor 38. Processor 38 can be a microprocessor, personal computer, or any other suitably programmed computing device. Processor 38 controls the internal operations of fax logger 11 and oversees the facsimile acquisition, archiving and retrieval processes. As facsimiles are being acquired, they are stored temporarily in storage 46. Storage 46 is any suitable storage device such as a hard disk drive. It is important that storage device 46 be suitably large and fast enough to store incoming acquired facsimile transmissions. Facsimiles remain on storage device 46 until they can be archived. Old facsimile documents are automatically removed from storage 46 in order that incoming facsimile documents have sufficient disk space to be stored. As will be described in more detail below, after facsimiles are acquired, related facsimile data about the transmission is stored in database 40. In FIG. 3, database 40 is illustrated as being internal and integral with fax logger 11. An externally located database would work as well. Once the relevant data has been stored in database 40, the facsimile is placed onto archive queue 44 where it awaits archiving. Eventually, the facsimile transmissions are taken from archive queue 44 and sent to archive subsystem 48 for permanent recording onto suitable archive media. It is a high priority to record the incoming facsimile transmission in storage as quickly as possible, in order to avoid potential problems caused by, for example, a power failure, etc. Thus a large and fast hard disk drive should be used for the storage (e.g., fast and wide SCSI-2 hard disk drives).

Processor 38 is coupled to a LAN interface 42 which provides an interface to the LAN. In addition, printer interface 36 couples processor 38 to a printer 34. Printer 34 functions to generate labels for the archive media to facilitate the handling of the actual disks, tape cassettes, etc.

Figure 4:
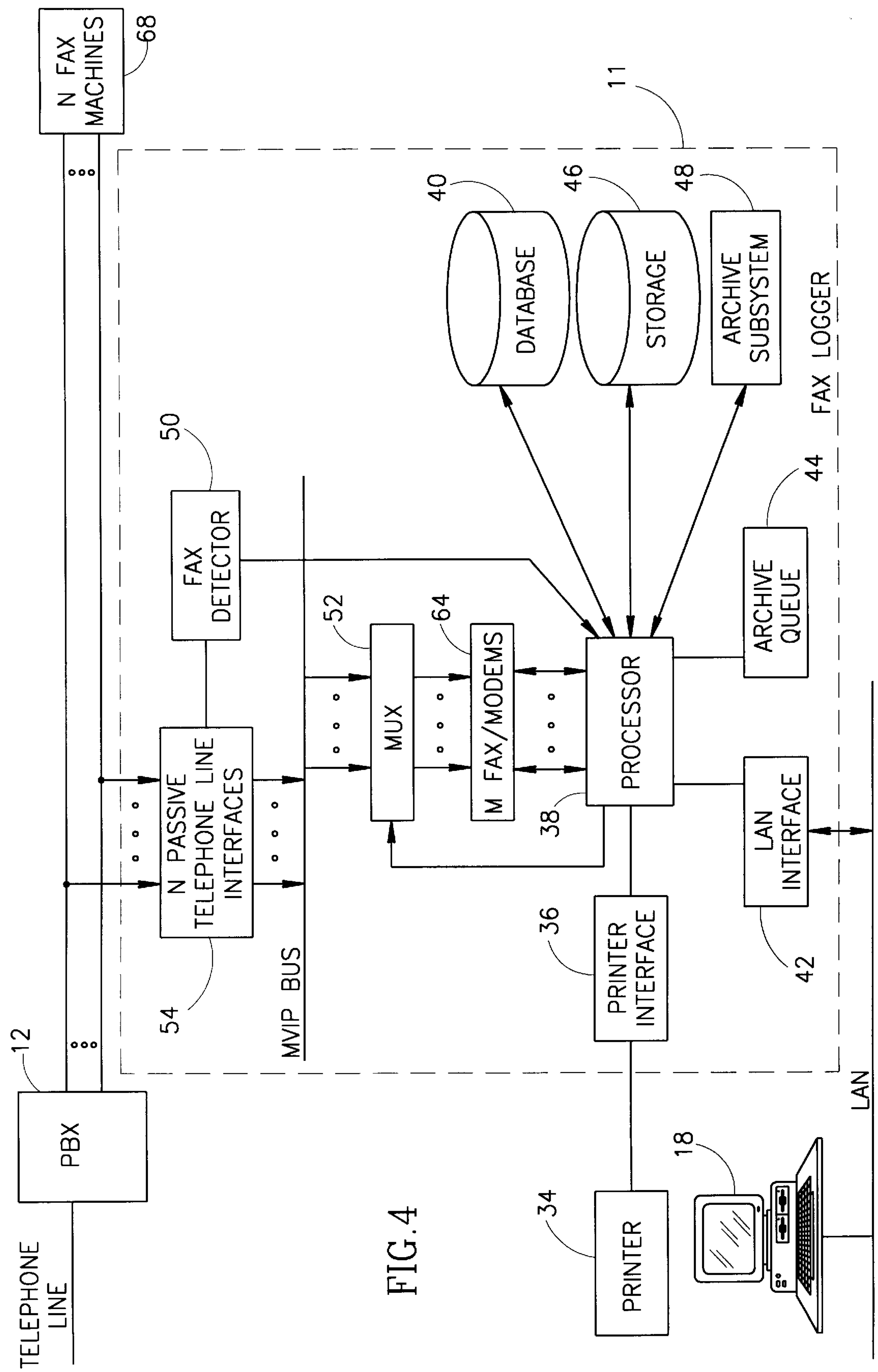
FIG. 4 is a detailed block diagram illustrating a multi-channel passive facsimile logging system applied to a sample telephone system.

A detailed block diagram illustrating a multiple channel fax logger applied in a passive configuration to a sample telephone system is shown in FIG. 4. In this embodiment, PBX 12 is coupled to N facsimile machines. Fax logger 11 is coupled to each of these N PBX extension lines through N passive telephone line interfaces 54. The functions of N passive telephone line interfaces 54 are similar to those described in connection with the single channel fax logger illustrated in FIG. 3. Each individual interface listens for facsimile transmission on its extension. In this embodiment, however, each telephone interface is coupled to a multi-vendor interface protocol (MVIP) bus, commonly used to allow different telco equipment from different vendors to communicate with each other. Also coupled to the MVIP bus is an N input/M output multiplexer (mux) 52. Mux 52 can be any device that can switch any of N inputs to any of M outputs, such as a multiple input and output switch, etc. Coupled to mux 52 are M fax/modems 64. Fax/modems 64 are identical to those described in connection with FIG. 3. Fax detection circuitry 50 is coupled to each of N individual passive telephone line interfaces 54 and to processor 38. Fax detector 50 functions to listen to each of N PBX extension lines and informs processor 38 when a facsimile transmission is occurring on a line.

Processor 38, database 40, storage 46, archive subsystem 48, archive queue 44, LAN interface 42, computer workstation 18 and printer interface 36 function similarly to the corresponding components described in connection with FIG. 3. The switching or selection control of mux 52 is performed by processor 38 through a control signal line coupled from processor 38 to mux 52. At any one time M fax/modems 64 are coupled to N telephone extension lines through the MVIP bus and the passive telephone line interfaces. Both N and M can be any positive integer. The system may have more telephone lines than fax/modems, an equal number of telephone lines and fax/modems or fewer telephone lines than fax/modems. Typically there will not be more telephone lines than fax/modems, in which case it is possible that some facsimile transmissions will be archived. Fax detector 50 listens to all N telephone extensions. When a facsimile transmission is detected, a signal is transmitted to processor 38, which, in turn, couples a fax/modem to the appropriate extension. The MVIP bus allows each passive telephone line interface to be connected to one of the inputs of mux 52.

Figure 5:
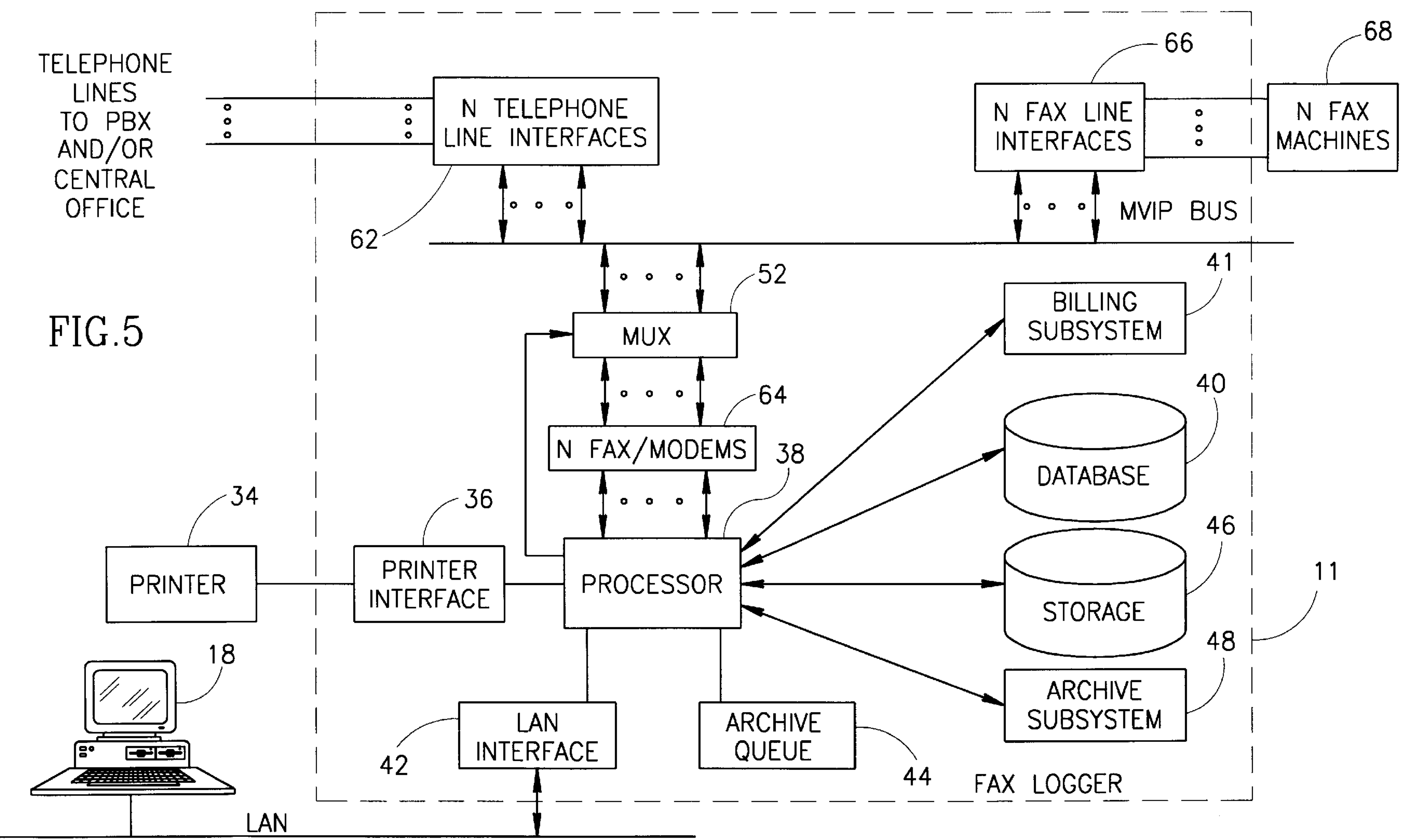
FIG. 5 is a detailed block diagram illustrating a multi-channel active facsimile logging system applied to a sample telephone system.

A detailed block diagram illustrating a multichannel active facsimile logging system applied to a sample telephone system is shown in FIG. 5. In this embodiment, the PBX extensions or telephone lines are not connected directly to the fax machines. The connection between telephone lines and fax machines is broken and the fax logger is inserted between them. All facsimile transmissions sent from and to the local fax machine are intercepted by the fax logger. In this manner, the fax logger controls the protocols used in the transmissions.

The N PBX extensions or telephone lines are input to N telephone line interfaces 62. The output of N telephone line interfaces 62 is coupled to an MVIP bus. Line interfaces 62 convert the signals present on the telephone line or PBX extension into signals suitable for placement onto the MVIP bus. N fax machines 68 are coupled to N fax line interfaces 66. The fax line interfaces provide an interface between the MVIP bus and the conventional facsimile signals used on regular telephone lines or extensions. Also coupled to the MVIP bus is an N input/M output multiplexer or switch 52. Mux 52 is able to switch any of N inputs onto any of M outputs. The M output signals from mux 52 are fed to M fax/modems 64. Each fax/modem handles the signal from a different output from mux 52. The fax/modems convert the telephone line signals into a format processor 38 can understand. The processor 38 receives the output of each fax/modem and provides a control signal to mux 52 to select which inputs are to be switched to which outputs. Database 40, storage 46, archive subsystem 48, archive queue 44, LAN interface 42, computer workstation 18 and printer interface 36 function similarly to the corresponding components discussed in connection with FIG. 3. The fax logger 11 also comprises a billing subsystem 41 for the accounting of facsimile transmissions.

In operation, processor 38 listens for facsimile transmissions on M telephone lines or PBX extensions. When a facsimile transmission is detected, it is stored on storage device 46 and forwarded to one of N fax machines at a later time. In addition, facsimile transmissions originating from N fax machines 68 are also detected. The store and forward mechanism assures that a standard facsimile transmission protocol will be used for both sending and receiving facsimiles. Once the facsimile is stored and placed onto the archive queue, as in the embodiments discussed previously, it is translated into a standard facsimile transmission protocol, regardless of the original transmission protocol used (i.e. PCS, TIFF, or any other compressed format). If the transmission originated on a telephone line or PBX extension it is sent out through the particular fax/modem 64 and mux 52, onto the MVIP bus, to one of N fax line interfaces and finally to one of N fax machines. If it originated from one of N fax machines 68, it is sent out through the particular fax/modem 64 and mux 52, onto the MVIP bus, to one of N telephone line interfaces 62 and out to the telephone line or PBX extension. This process will be described in more detail below.

The fax logger 11 is also operative to detect a series of numbers entered by the user of the fax machine 68. The series of numbers is entered by the user using the built in keypad of the fax machine. The numbers are attached to the destination telephone number and separated by a delimiter such as the '#' symbol. These numbers are used to provide information representing the identity of the operator, billing information such as account numbers and subaddressing information. The subaddressing information can be added to the facsimile transmission regardless of whether the fax machine 68 has the subaddressing feature.

The series of numbers entered by the user on the keypad of the fax machine 68 is detected and processed by the processor 38. The information represented by the numbers is stored in the database 40 along with other pertinent information about the fax transmission. When the fax logger transmits the fax document to the destination telephone number input by the user, a message is sent to the user signifying that the fax was sent. The message can be sent by electronic mail (e-mail) over the LAN or by any other type of networking message generated by an application running on the operator workstation that functions to notify the user. The destination for the message is denoted by the operator ID entered by the user. Thus, the confirmation status of the fax document transmitted is conveyed to the user via her/his computer workstation.

The billing subsystem 41 is operative to retrieve information from the fax logger database 40 and generate one or more reports that include information about the fax transmissions performed. The reports may include, for example, the number of pages per day, the number of pages per week, the number of pages per month or the total number of pages that were sent by the fax logger for each account number. The billing information contained in the reports can be displayed on the computer workstation 18 and/or printed to the printer 34.

In addition, the present invention provides the capability of providing subaddressing features for fax machines that do not have this capability. Since the fax transmission that is ultimately placed onto the telephone lines 62 is generated by the processor 38 via the fax/modem 64, the subaddressing information can be inserted into the outgoing transmission. The subaddress information input by the user on the keypad of the fax machine 68 is formatted in accordance with the ITU T.30 and T.33 standards and placed in the outgoing fax transmission.

Similarly, incoming fax transmissions can be routed in accordance with the subaddress information contained in the incoming transmission. Thus, the subaddress feature can be exploited regardless of whether the fax machines 68 support this feature.

Figure 6:
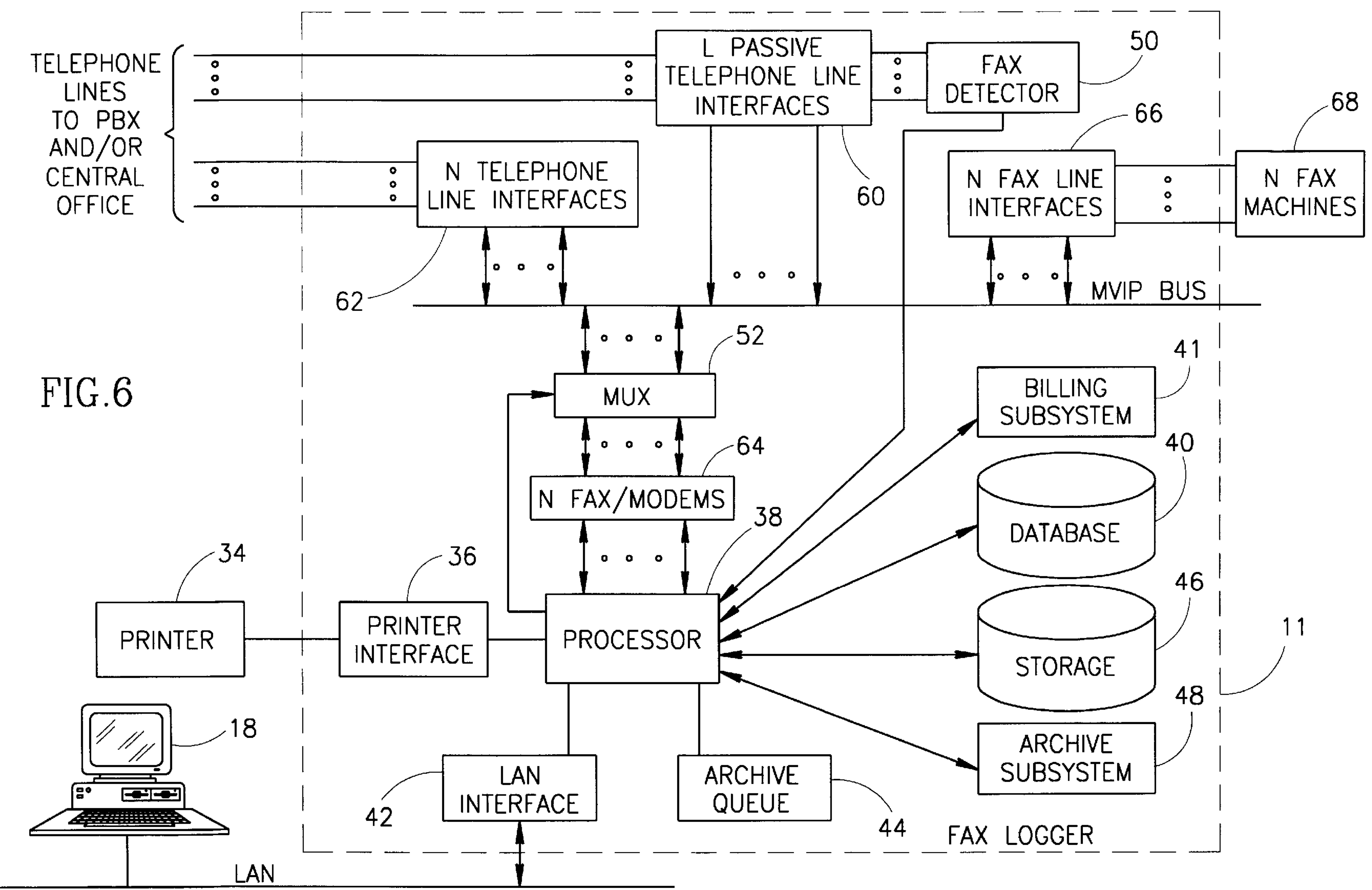
FIG. 6 is a detailed block diagram illustrating a multi-channel active and passive facsimile logging system applied to a sample telephone system.

A high level block diagram of an embodiment of the fax logger combining both the passive and active embodiments is illustrated in FIG. 6. In this embodiment, L telephone lines or PBX extensions are coupled to L passive telephone line interfaces 60. The L passive telephone line interfaces are passively coupled to the lines that connect the telephone lines or PBX to fax equipment in such a way that the telephone line or PBX extension is not interfered with. L passive telephone line interfaces 60 are coupled to fax detector 50 which functions to detect the start of a facsimile transmission on any of its connected lines. The fax detector is coupled to processor 38 through a control signal line. The output of L passive telephone line interfaces 60 is coupled to the MVIP bus. Mux 52 functions to connect any of L outputs of L passive telephone interfaces 60 to any of M fax/modems 64. The numbers L, N and M are all positive integers.

In addition to the passive portion of the fax logger, the active portion of the fax logger comprises N telephone line interfaces 62 coupling N telephone lines or PBX extensions to the MVIP bus and N fax line interfaces 66 coupling N fax machines to the MVIP bus. Mux 52 functions to couple any of N telephone line interfaces 62 or N fax line interfaces 66 to any of M fax/modems 64. The remaining portion of the fax logger operates similarly, for both passive and active portions, as previously described in connection with FIGS. 4 and 5, respectively.

Figure 7:
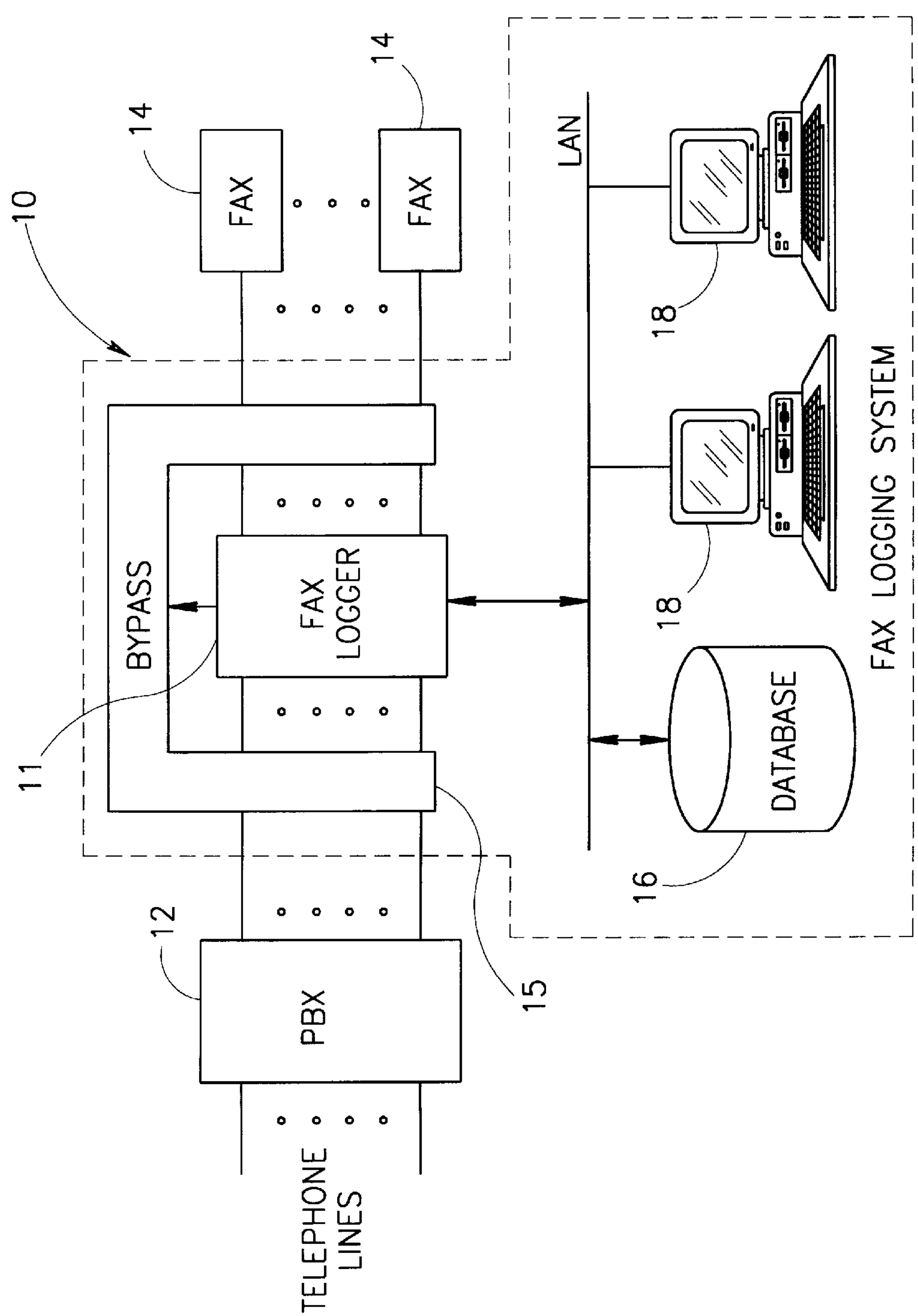
FIG. 7 is a high level block diagram illustrating an embodiment of the active facsimile logging system of the present invention incorporating a bypass.

In the embodiments where the facsimile logging system of the present invention is connected to the telephone line actively as opposed to passively, a failure of the logging system may cause a disruption in the receipt or transmission of facsimiles. In order to prevent any such disruptions, the facsimile logging system incorporates a bypass mechanism. A high level block diagram illustrating an embodiment of the active facsimile logging system of the present invention incorporating a bypass is shown in FIG. 7. In this embodiment, the bypass or override device 15 is placed between the PBX 12 and the fax logger 11 and between the fax machines 14 and the fax logger 11. In the event the fax logger fails, the bypass 15 functions to disconnect the fax logger from the PBX and the fax machines and connect the PBX lines directly to the fax machines.

Software within the fax logger continuously sends the fax logger an indication that it is functioning properly. If the software in the fax logger detects a problem, e.g., in a software or a hardware component, the fax logger stops sending a positive indication to the bypass. Instead, either a negative indication or no indication at all is sent to the bypass. The indication can take the form of a keep alive signal or a message. The bypass 15 is operative to receive the indication from the fax logger and keep the fax logger connected as long the indication is positive, i.e., the fax logger is operating properly. If the fax logger stops sending the indication (the fax logging system has crashed), the bypass 15 will disconnect the fax logger and connect the PBX directly to the fax machines after a predetermined time out period.

Figure 8:
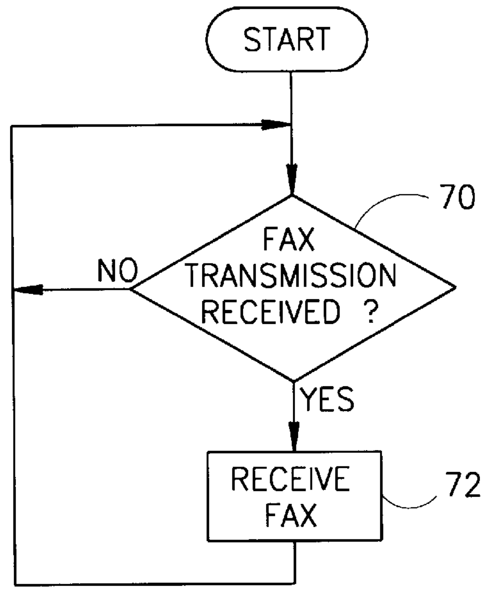
FIG. 8 a high level logic flow diagram illustrating the overall computer software process of the passive facsimile logging system.

A high level flow diagram of the software process used to control the passive fax logger is illustrated in FIG. 8. Generally, the fax logger waits and continually listens for a facsimile transmission (step 70). Once detected, the facsimile transmission is received (step 72).

Figure 9:
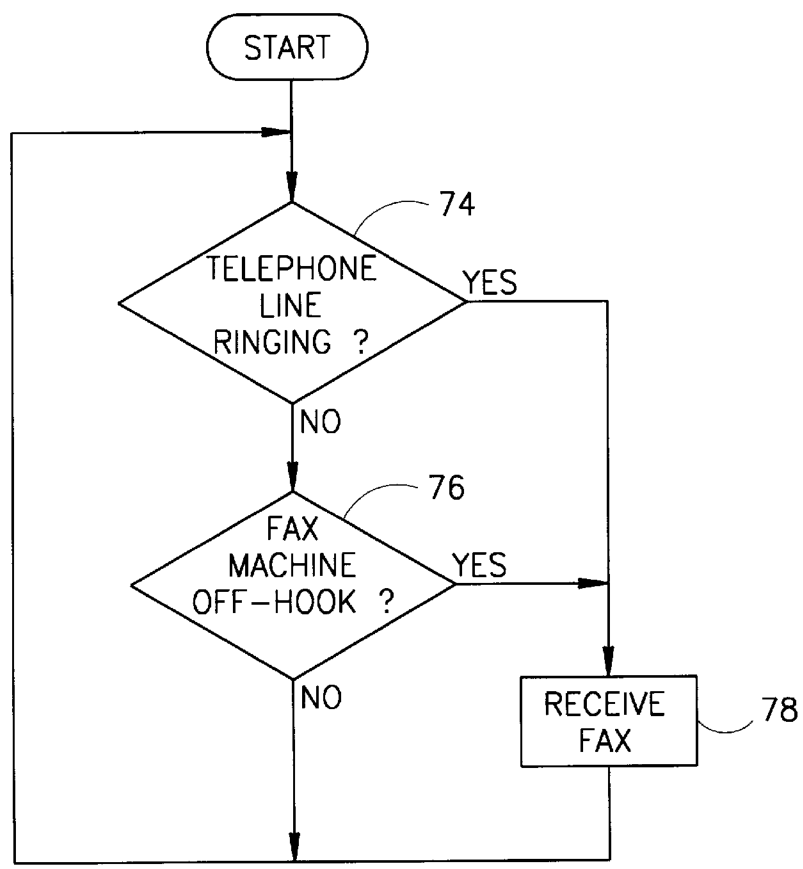
FIG. 9 is a high level logic flow diagram illustrating the overall computer software process of the active facsimile logging system.

A high level flow diagram of the software process used to control the active fax logger is illustrated in FIG. 9. Generally, the fax logger waits and listens for either the telephone line/PBX extension to ring (step 74) or for one of the fax machines to go off-hook (step 76). Once either of these events occur, the facsimile transmission is received (step 78).

Figure 10:
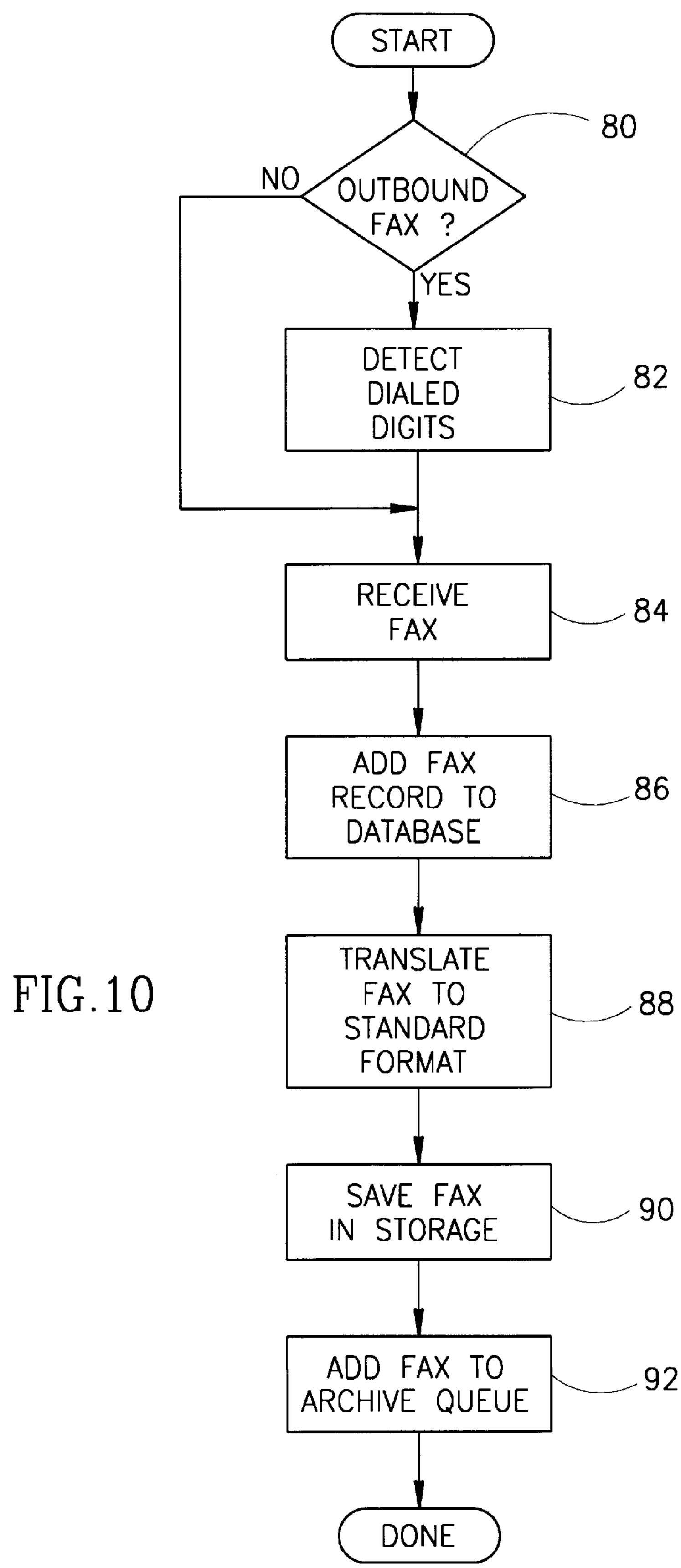
FIG. 10 is a high level logic flow diagram illustrating the receive facsimile process of the passive facsimile logging system.

The receipt of a facsimile transmission in the passive fax logger will now be described in more detail. A high level logic flow diagram illustrating the receive facsimile process of the passive facsimile logging system is shown in FIG. 10. First, it is determined whether the facsimile is outbound or inbound (step 80). It is outbound if one of fax machines went off-hook and dual tone multiple frequency (DTMF) tones are detected. It is inbound if ringing is detected on the line. If the facsimile is outbound than the digits are detected as they are dialed (step 82). For both outbound and inbound facsimiles, the transmission is then received (step 84). A database record is then created in database 40 (FIGS. 3 and 4) for holding data related to the facsimile transmission (step 86). The facsimile transmission is then translated into a standard format regardless of the original format used (step 88). Standard formats include formats such as PCX, TIFF, or any other standard bit mapped graphic format. The data is also typically compressed before being saved to storage. The facsimile is then stored in storage 46 (FIGS. 3 and 4) in the standard format (step 90). The facsimile is then added to archive queue 44 (FIGS. 3 and 4) which is a queue holding facsimiles waiting to be archived (step 92).

Figure 11:
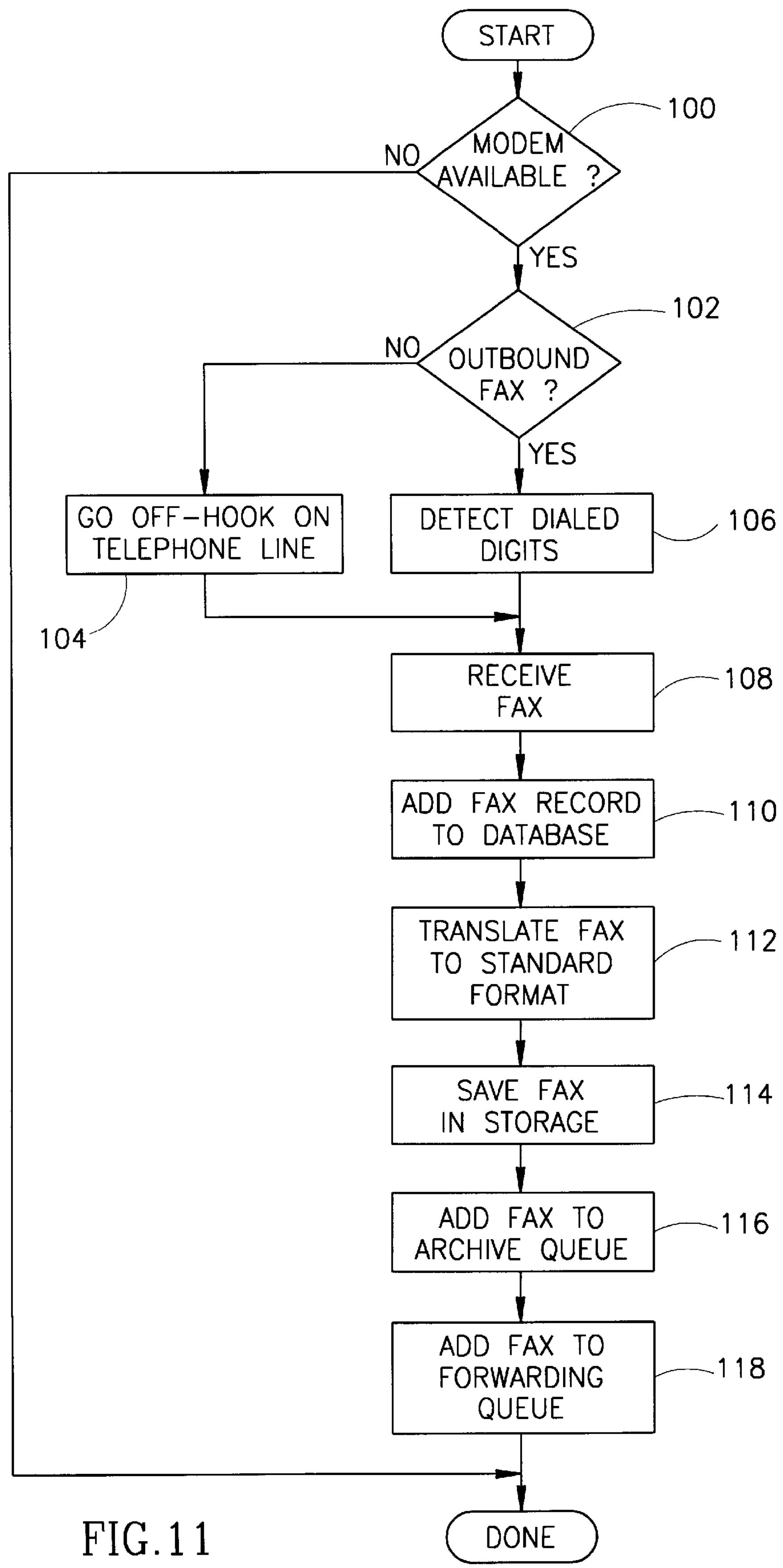
FIG. 11 is a high level logic flow diagram illustrating the receive facsimile process of the active facsimile logging system.

The receipt of a facsimile transmission in the active fax logger will now be described in more detail. A high level logic flow diagram illustrating the receive facsimile process of the active facsimile logging system is shown in FIG. 11. After the presence of a facsimile transmission is detected, it is determined whether a modem is available (step 100). If no modems are available, the facsimile cannot be archived and the process is exited. If a modem is available, it is determined whether the facsimile is outbound or inbound (step 102). With reference to FIGS. 5 and 6, the telephone lines 62 and fax line interfaces 66 are separately connected to the MVIP bus. Inbound faxes are detected via the ringing signal received on a telephone line interface. Outbound faxes are detected by a fax machine 68 going off hook. If the fax transmission is inbound, the particular telephone line interface 62 is made to go off-hook (i.e. the call is answered) (step 104). If the fax transmission is outbound, the off-hook condition and the dialed DTMF digits can be detected (step 106). The digits detected include not only the destination telephone number but also the numbers representing the operator identity, billing information and subaddressing related data. For both inbound and outbound facsimiles, the transmission is then received (step 108). Similar to the passive receive facsimile process, a database record is then created in database 40 (FIGS. 5 and 6) for holding data related to the facsimile transmission (step 110). Regardless of the original facsimile transmission protocol, it is translated into a standard format (step 112). Standard formats include formats such as PCX, TIFF, or any other standard bit mapped graphic format. The data is also typically compressed before being saved to storage. In addition, any subaddressing information contained in the transmission is extracted and processed. The facsimile is then stored in storage 46 (FIGS. 5 and 6) in the standard format (step 114). The facsimile is then added to archive queue 44 (FIGS. 5 and 6) which is a queue holding facsimiles waiting to be archived (step 116). Finally, the facsimile is added to the forwarding queue to complete the store and forward process (step 118).

Figure 12:
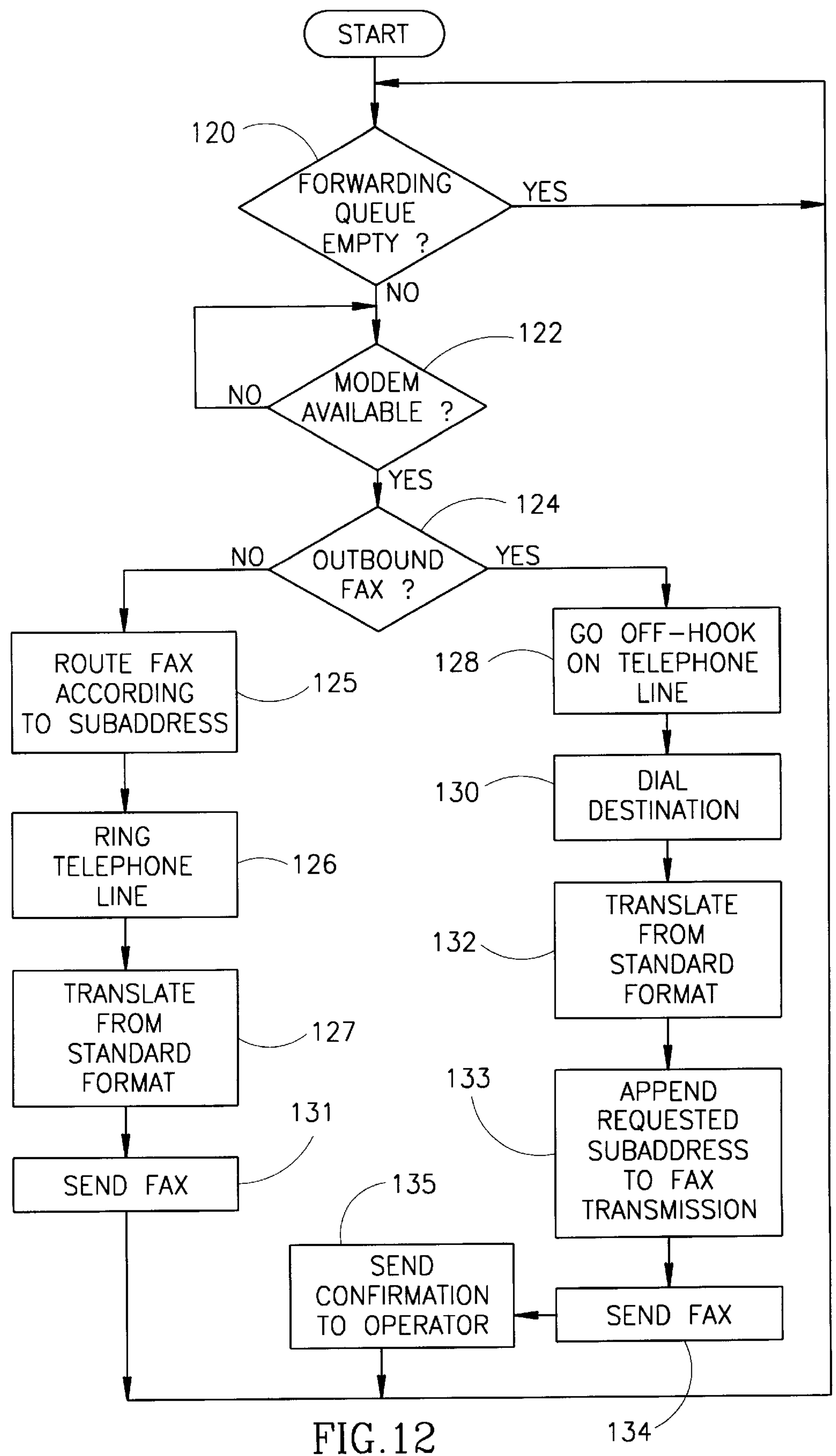
FIG. 12 is a high level flow diagram illustrating the forwarding process of the active facsimile logging system.

The forwarding portion of the store and forward process will now be described in more detail. A high level flow diagram illustrating the forwarding process of the active facsimile logging system is shown in FIG. 12. The forwarding queue is continually checked for facsimiles (step 120). Once the queue becomes not empty, it is determined whether there is an available modem (step 122). If there is an available modem, it is then determined whether the facsimile is inbound or outbound (step 124). This determination was described previously in connection with the logic flow diagram of FIG. 11. If the transmission is outbound, the line connecting the particular telephone line interface 62 to the telephone line or PBX extension is made to go off-hook (step 128) and the destination is dialed (step 130) using the digits collected previously (step 106, FIG. 11). Then, the facsimile is translated and decompressed from the standard format, previously stored, into the ITU standard T4 format using the standard facsimile transmission protocol (step 132). After translation, the requested subaddress data is appended to the fax transmission (step 133). The facsimile is then sent (step 134). After the facsimile is transmitted, a confirmation is sent to the operator (step 135). The confirmation includes status information concerning, for example, the success or failure of the facsimile transmission. The confirmation can be sent to the user via e-mail means over the LAN.

If the transmission is inbound (step 124), the received fax transmission is routed in accordance with the routing information contained in the subaddress portion of the transmission (step 125). Subsequently, the line connecting the particular fax line interface 66 to the destination fax machine 68 (FIGS. 5 and 6) is made to ring (step 126). The facsimile is then translated and decompressed from the standard format, previously stored, into the ITU standard T4 format using the standard facsimile transmission protocol (step 127). The fax transmission is then sent to the particular fax machine (step 131).

Figure 13:
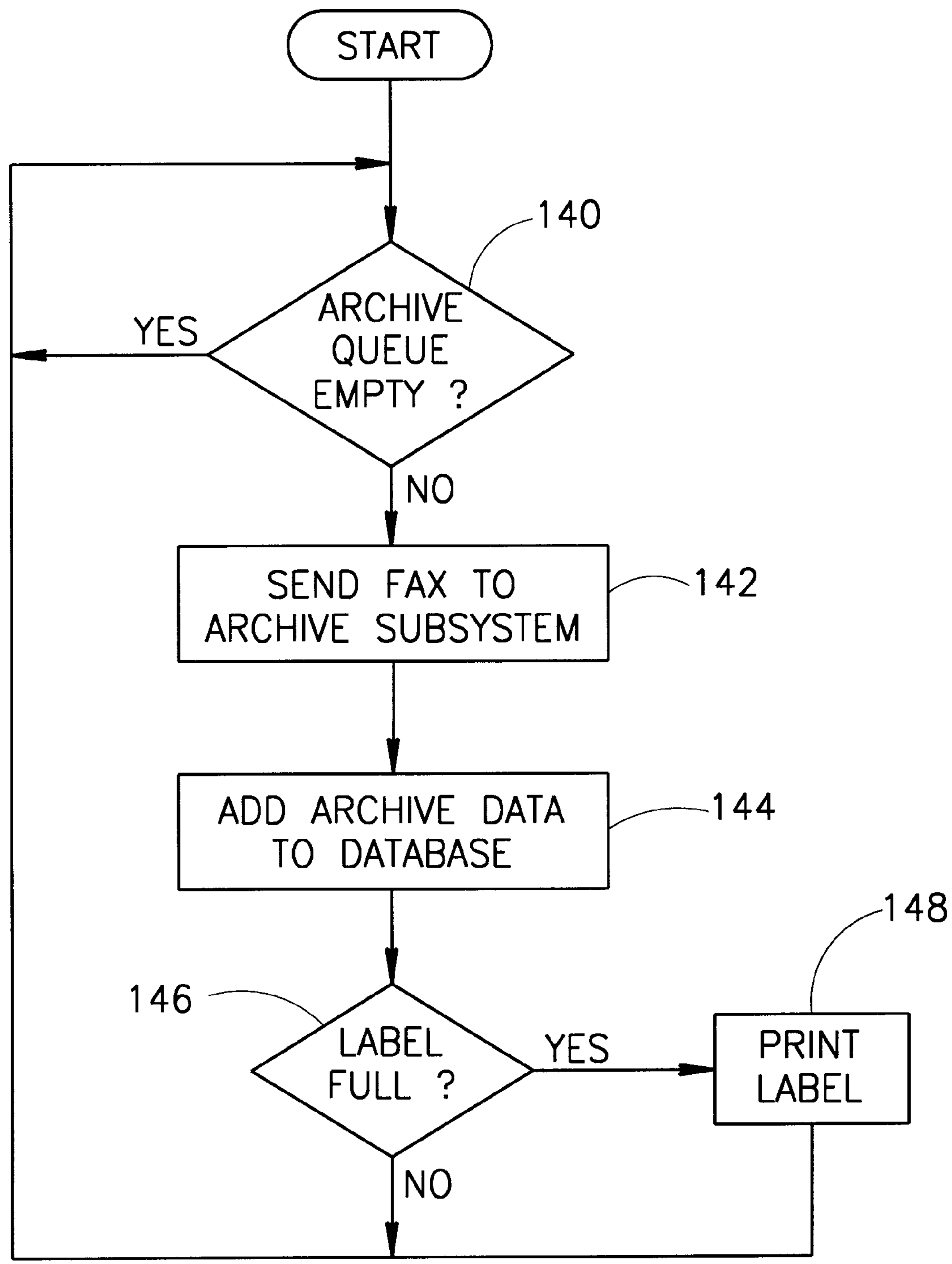
FIG. 13 is a high level flow diagram illustrating the archive process of both the passive and active facsimile logging systems.

The archive process will now be described in more detail. A high level flow diagram illustrating the archive process of both the passive and active facsimile logging systems is shown in FIG. 13. First, it is determined whether the archive queue is empty (step 140). If the queue is not empty, the facsimile is sent to the archive subsystem (FIGS. 3, 4, 5, 6) where it is recorded onto long term storage media such as magnetic tape, optical disk storage, magneto-optical storage, etc. (step 142). Once the facsimile is recorded onto long term media, the corresponding record in database 40 (FIGS. 3, 4, 5, 6) is updated with the appropriate data (i.e. data pointers) related to the archive (step 144). In addition, to facilitate handling of the various tapes, disks or other media by system operators, labels are generated when the contents of the corresponding media (i.e. tape or disk) become full. Each facsimile recorded is tracked and an entry is added in a label list for that particular tape or disk. Once it is determined that the media is full (step 146), the label is printed (step 148).

Figure 14:
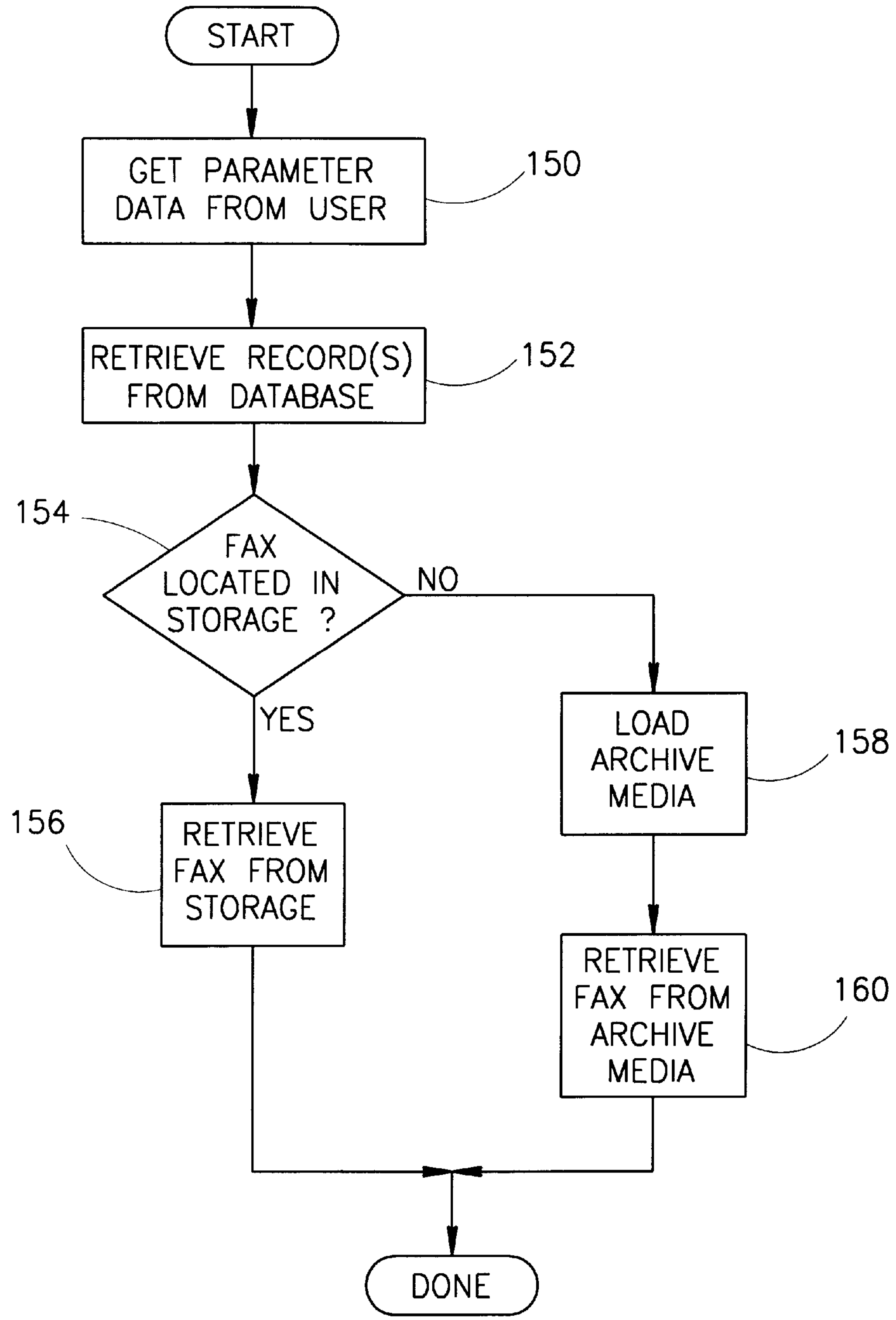
FIG. 14 is a high level flow diagram illustrating the facsimile retrieval process of both the passive and active facsimile logging systems.

The retrieval process of the fax logging system will now be described in more detail. A high level flow diagram illustrating the facsimile retrieval process of both the passive and active facsimile logging systems is shown in FIG. 14. First, the user of the retrieval system enters the parameters comprising the search (step 150). A search engine searches and retrieves the records from the database matching the previously entered search criteria (step 152). If the facsimiles corresponding to the database records found in the search (step 154) are present in storage 46 (FIGS. 3, 4, 5, 6), then they are retrieved from there (step 156). If the they are not located in storage, the appropriate archive media is first loaded onto the system (step 158). For example, if the facsimile exists on a tape located in a tape library, the tape is either manually or automatically retrieved (i.e. through a jukebox). The facsimiles are then retrieved from the long term archive media for viewing and browsing by the user (step 160).

Figure 15:
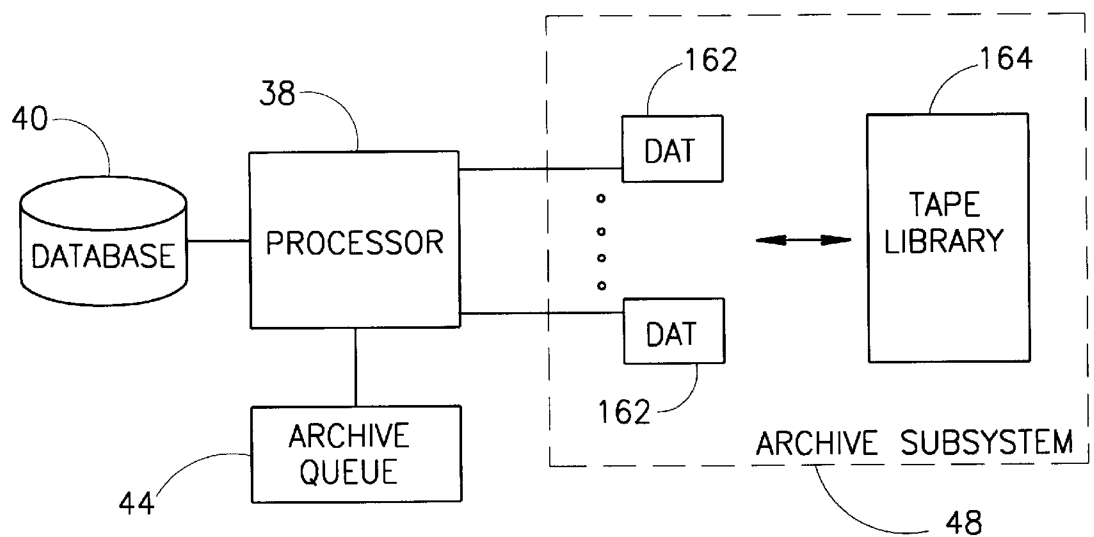
FIG. 15 is a high level block diagram illustrating the archive subsystem of both the passive and active facsimile logging systems.

An example of an archive subsystem 48 used in both the passive and active facsimile logging systems is illustrated in FIG. 15. Processor 38 is coupled to database 40 and archive queue 44. Archive subsystem 48 comprises one or more archive units, such as DAT drives 162. Alternatively, archive units 162 may be any suitable archive media such as tape, optical, etc. In the case of magnetic tape, a tape library 164 holds tape cassettes full of archived facsimile data. When facsimile search requests are made, the appropriate tape is pulled from tape library 164 and inserted in one of DAT recorders/players 162. In addition, archive units 162 can be arranged in one of several configurations to increase archive reliability and/or performance. Such configurations include mirroring, autoswitching of a unit when its media becomes full, using one archive unit for recording and one for retrieval and using autochangers to automate the retrieval process.

Figure 16:
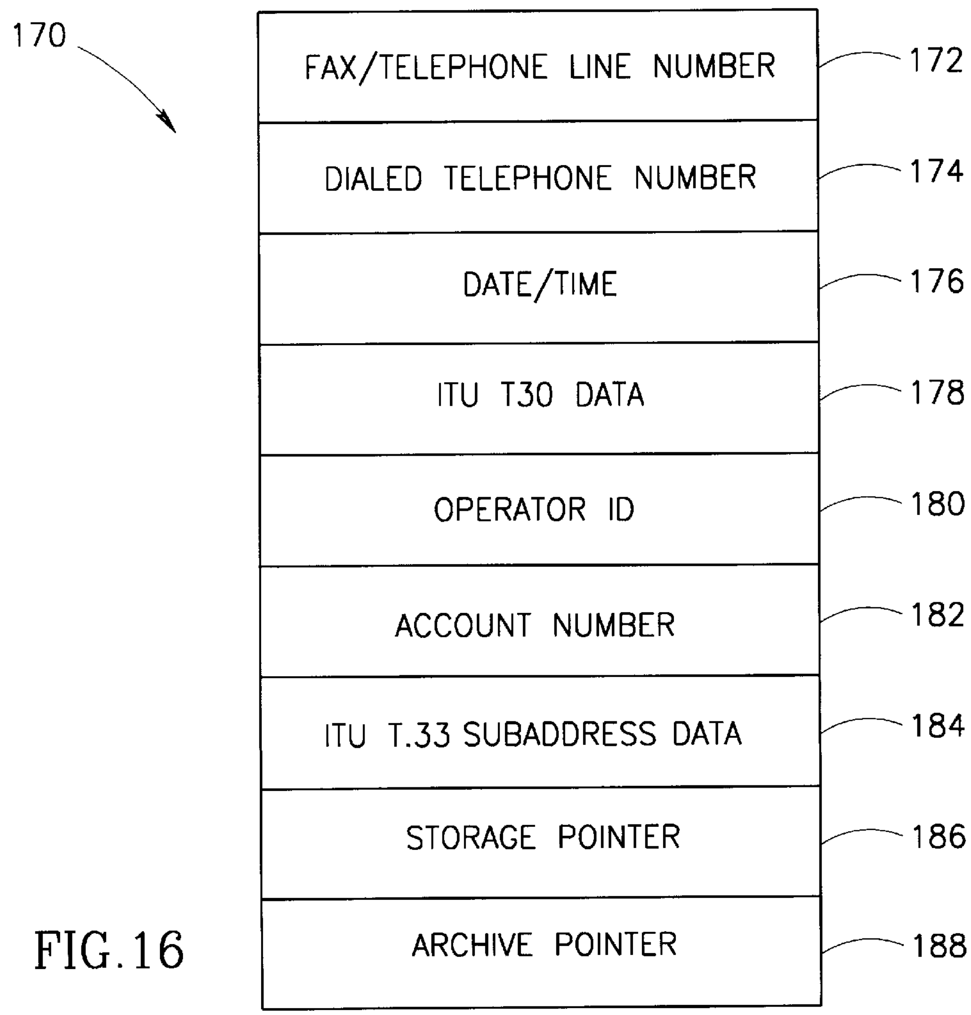
FIG. 16 illustrates the data fields comprising a record of the database used in maintaining information about each facsimile archived in the system.

The data fields comprising a record 170 of the database used in maintaining information about each facsimile archived in the system is illustrated in FIG. 16. The facsimile or telephone line number 172 used is recorded in addition to the dialed telephone number 174 and the date/time of the received facsimile 176. ITU T30 data 178 includes information such as caller ID, receiver ID, facsimile resolution, page size, compression and other facsimile related data. The operator ID 180, account billing information 182 and ITU T.33 subaddress data that was entered by the user is also recorded. In addition, a storage pointer 186 to the storage area where the facsimile is stored and an archive pointer 188 to the location where the facsimile is archived is also recorded as fields in the database record.

Another feature of the fax logger of the present invention is the monitoring of the lines connecting the N fax line interfaces to the N fax machines (FIGS. 5 and 6). When a line associated with a particular fax machine is idle for a predetermined amount of time, a test fax transmission is sent from the fax logger to the fax machine. If the status of the line is detected as not ready, then the fax logger reports to a control workstation that the particular fax machine is disconnected from the line. If the line is functioning correctly, but the test fax document transmission fails, then the fax logger reports to the control workstation that that particular fax machine is malfunctioning. The reports sent to the control workstation, which could be located anywhere on the network, provide information for a technician as to specific malfunctioning fax machines and the time of day the fax machine was determined to be malfunctioning.

Figure 17:
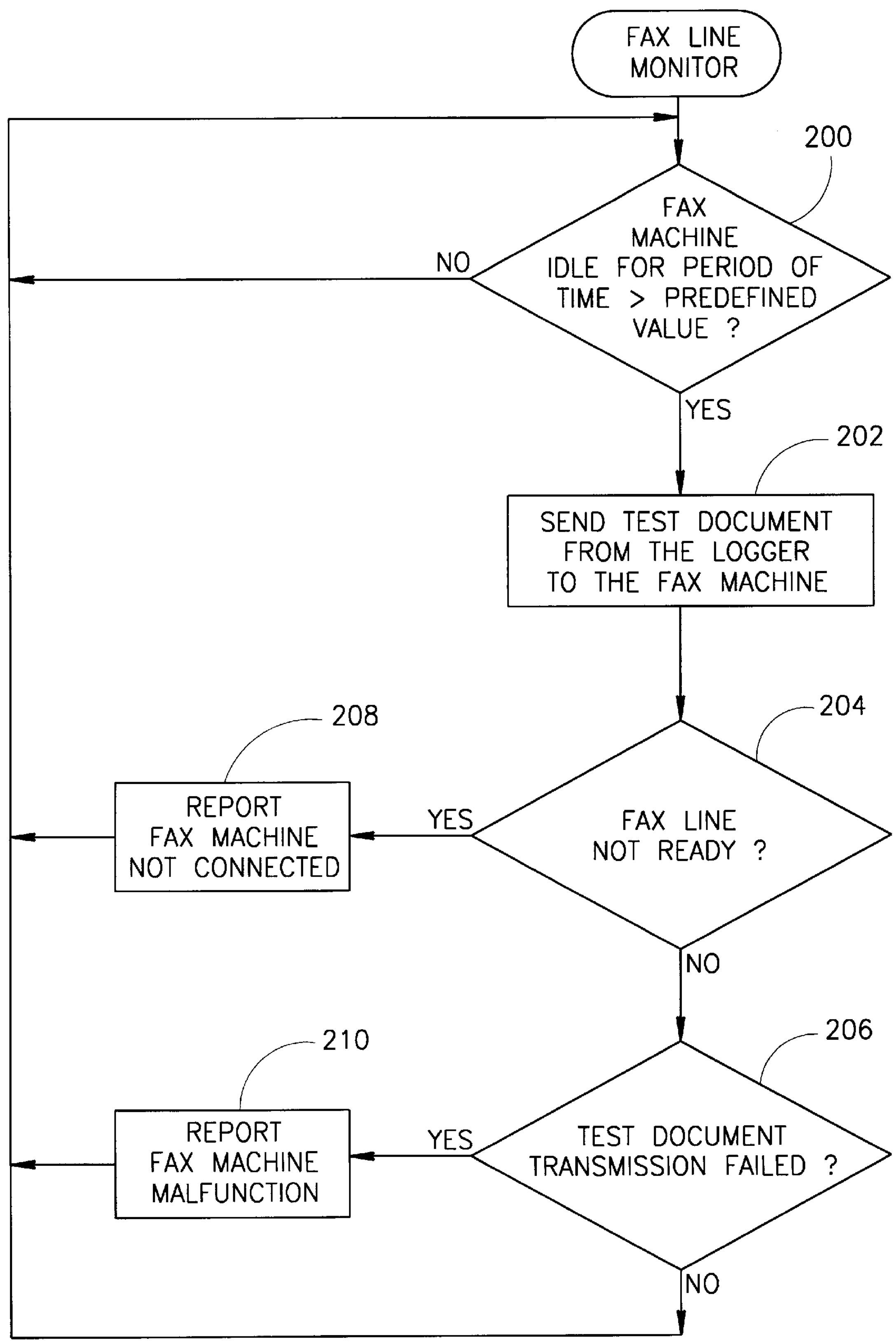
FIG. 17 is a high level block diagram illustrating the line monitoring process of the active facsimile logging system.

A high level block diagram illustrating the line monitoring process of the active facsimile logging system is shown in FIG. 17. First, it is determined whether a fax machine is idle for a predefined time period of time (step 200). An idle counter maintained inside the fax logger is used to determine this. If the fax machine has been idle for more than the predetermined amount of time, the test document is sent from the fax logger to the particular fax machine (step 202). If it is determined that the fax line connecting the fax line interface to the fax machine is not ready (step 204), a report is generated stating that the fax machine is not connected properly (step 208). Similarly, if it is determined that the test document transmission failed (step 206), a report is generated stating that a malfunction exists in the particular fax machine (step 210).

While the invention has been described with respect to a limited number of embodiments, it will be appreciated that many variations, modifications and other applications of the invention may be made.

What is claimed is:

1. A long term facsimile transmission storage and retrieval system, comprising:

first processor means adapted to provide facsimile logging, said first processor means operatively coupled between at least one telephone line via a private branch exchange extensions or a standard telephone line and at least one facsimile machine via a local connection, said first processor means storing and forwarding inbound facsimile transmissions that arrive on said at least one telephone line and outbound facsimile transmission that originate from said at least one facsimile machine over said local connection, said first processor means operative to permanently archive said inbound and said outbound facsimile transmissions on long term archive media so as to permit random retrieval;

a database coupled to said first processor means, said database for holding relevant data associated with said stored facsimile transmission;

second processor means operatively coupled to said first processor means, said second processor means able to search and retrieve said facsimile transmissions previously stored by said first processor means on said long term archive media, said search and retrieval operations occurring independently of said inbound transmission, outbound transmission and archiving functions of said first processor means;

means for accepting and processing data supplied by a user, said data including operator identity, account information for billing and sub address data;

third processor means operatively coupled to said first processor means, said third processor means for generating and sending a confirmation message to the user regarding the result of the facsimile transmission;

means for appending said sub address data to said outbound facsimile transmissions; and bypass means coupled between said first processor means and said at least one telephone line and between said first processor means and said at least one facsimile machine, said bypass means operative to receive a keep alive indication from said first processor means, said bypass means operative to disconnect said first processor means and connect said at least one telephone line directly to said at least one facsimile machine in the event said keep alive indication is not received within a predetermined time period.

2. A facsimile logger coupled between a telephone line and a facsimile machine, comprising:

a telephone line interface coupled to the telephone line, said telephone line interface interfacing the telephone line to an internal data bus;

a facsimile line interface coupled to the facsimile machine, said facsimile line interface for interfacing the facsimile machine to said internal data bus;

a switch having an input port and an output port, said input port coupled to said internal data bus, said output port coupled to a fax/modem, said switch able to couple said telephone line interface to said fax/modem and said facsimile line interface to said fax/modem;

said fax/modem coupled to said switch, said fax/modem for translating said facsimile transmissions between a telephone line facsimile signal format and digital facsimile data;

a processor coupled to said fax/modem for receiving and processing said digital facsimile data, said processor controlling the operation of the facsimile logger, said processor for determining the input to output configuration of said switch;

a database coupled to said processor, said database holding relevant data associated with said facsimile transmissions;

storage means coupled to said processor, said storage means providing a temporary memory storage area for said facsimile transmissions as they are received from the telephone line;

an archive subsystem coupled to said processor, said archive subsystem recording said facsimile transmissions on long term archive media, said archive subsystem retrieving said facsimile transmissions, previously archived, upon command from said processor;

means for accepting and processing data supplied by a user, said data including operator identity, account information for billing and subaddress data;

means for generating and sending a confirmation message to the user regarding the result of the facsimile transmission; and means for appending said subaddress data to said outbound facsimile transmissions.

3. The facsimile logger according to claim 2, wherein said internal data bus comprises a Multi-Vendor Interface Protocol (MVIP) bus.

4. The facsimile logger according to claim 2, wherein said switch comprises a multiplexor.

5. A multi-channel facsimile logger coupled to N telephone lines and to N facsimile machines, comprising:

N telephone line interfaces, each telephone line interface coupled to one of said N telephone lines, said N telephone line interfaces for interfacing said N telephone lines to an internal data bus;

N facsimile line interfaces, each facsimile line interface coupled to one of said N facsimile machines, said N facsimile line interfaces interfacing said N facsimile machines to said internal data bus;

a switch having N input ports and M output ports, said N input ports coupled to said internal data bus, each output port coupled to one of M fax/modems, said switch able to couple any one telephone line interface to any one fax/modem and any one facsimile line interface to any one fax/modem;

said M fax/modems for translating said facsimile transmissions between a telephone line facsimile signal format and digital facsimile data;

a processor coupled to said M fax/modems for receiving and processing said digital facsimile data, said processor controlling the operation of said active facsimile logger, said processor for determining the input to output configuration of said switch;

a database coupled to said processor, said database holding relevant data associated with said facsimile transmissions;

a storage coupled to said processor, said storage providing a temporary memory storage area for said facsimile transmissions as they are received from said telephone line;

an archive subsystem coupled to said processor, said archive subsystem recording said facsimile transmissions on long term archive media, said archive subsystem retrieving said facsimile transmissions, previously archived, upon command from said processor;

means for accepting and processing data supplied by a user, said data including operator identity, account information for billing and subaddress data;

means for generating and sending a confirmation message to the user regarding the result of the facsimile transmission;

means for appending said subaddress data to said outbound facsimile transmissions; and wherein N and M are both positive integers.

6. The multi-channel facsimile logger according to claim 5, wherein said internal data bus comprises a Multi-Vendor Interface Protocol (MVIP) bus.

7. The multi-channel facsimile logger according to claim 5, wherein said switch comprises an N input and M output multiplexor.

8. A multi-channel facsimile logger, comprising:

L passive telephone line interfaces, each passive telephone line interface coupled to one of L telephone lines, said L passive telephone line interfaces interfacing said L telephone lines to an internal data bus, said L passive telephone interfaces operative to not interfere with facsimile transmissions occurring on said L telephone lines;

a facsimile detector coupled to said L passive telephone line interfaces, said facsimile detector detecting the presence of said facsimile transmissions on said L telephone lines;

N telephone line interfaces, each telephone line interface coupled to one of N telephone lines, said N telephone line interfaces interfacing said N telephone lines to an internal data bus;

N facsimile line interfaces, each facsimile line interface coupled to one of N facsimile machines, said N facsimile line interfaces interfacing said N facsimile machines to said internal data bus;

a switch having N input ports and M output ports, said N input ports coupled to said internal data bus, each output port coupled to one of M fax/modems, said switch able to couple any one of said N telephone line interfaces to any one of said M fax/modems, any one of said N facsimile line interfaces to any one of said M fax/modems and any one of said L passive telephone line interfaces to any one of said M fax/modems;

said M fax/modems for translating said facsimile transmissions between a telephone line facsimile signal format and digital facsimile data;

a processor coupled to said M fax/modems for receiving and processing said digital facsimile data, said processor controlling the operation of said active facsimile logger, said processor for determining the input to output configuration of said switch;

a database coupled to said processor, said database holding relevant data associated with said facsimile transmissions;

a storage coupled to said processor, said storage providing a temporary memory storage area for said facsimile transmissions as they are received from said telephone line;

an archive subsystem coupled to said processor, said archive subsystem recording said facsimile transmissions on long term archive media, said archive subsystem retrieving said facsimile transmissions, previously archived, upon command from said processor;

means for accepting and processing data supplied by a user, said data including operator identity, account information for billing and subaddress data;

means for generating and sending a confirmation message to the user regarding the result of the facsimile transmission;

means for appending said subaddress data to said outbound facsimile transmissions; and wherein L, M and N are positive integers.

9. The multi-channel facsimile logger according to claim 8, wherein said internal data bus comprises a Multi-Vendor Interface Protocol (MVIP) bus.

10. The multi-channel facsimile logger according to claim 8, wherein said switch comprises an N input and M output multiplexor.

11. A multi-channel facsimile logger coupled to N telephone lines and to N facsimile machines, comprising:

N telephone line interfaces, each telephone line interface coupled to one of said N telephone lines, said N telephone line interfaces for interfacing said N telephone lines to an internal data bus;

N facsimile line interfaces, each facsimile line interface coupled to one of said N facsimile machines, said N facsimile line interfaces interfacing said N facsimile machines to said internal data bus;

a switch having N input ports and M output ports, said N input ports coupled to said internal data bus, each output port coupled to one of M fax/modems, said switch able to couple any one telephone line interface to any one fax/modem and any one facsimile line interface to any one fax/modem;

said M fax/modems for translating said facsimile transmissions between a telephone line facsimile signal format and digital facsimile data;

a processor coupled to said M fax/modems for receiving and processing said digital facsimile data, said processor controlling the operation of said active facsimile logger, said processor for determining the input to output configuration of said switch;

bypass means coupled between said logger and said N telephone lines and between said logger and said N facsimile machines, said bypass means operative to receive a keep alive indication from said facsimile logger, said bypass means operative to disconnect said facsimile logger and connect said N telephone lines directly to said N facsimile machines in the event said keep alive indication is not received within a predetermined time period; and wherein N and M are both positive integers.

12. The facsimile logger according to claim 11, further comprising:

a database coupled to said processor, said database holding relevant data associated with said facsimile transmissions;

a storage coupled to said processor, said storage providing a temporary memory storage area for said facsimile transmissions as they are received from said telephone line;

an archive subsystem coupled to said processor, said archive subsystem recording said facsimile transmissions on long term archive media, said archive subsystem retrieving said facsimile transmissions, previously archived, upon command from said processor;

means for accepting and processing data supplied by a user, said data including operator identity, account information for billing and subaddress data;

means for generating and sending a confirmation message to the user regarding the result of the facsimile transmission; and means for appending said subaddress data to said outbound facsimile transmissions.

13. The multi-channel facsimile logger according to claim 11, wherein said internal data bus comprises a Multi-Vendor Interface Protocol (MVIP) bus.

14. The multi-channel facsimile logger according to claim 11, wherein said switch comprises an N input and M output multiplexor.

* * * * *